(12) United States Patent
Alexander et al.

(10) Patent No.: US 6,766,418 B1
(45) Date of Patent: Jul. 20, 2004

(54) METHODS AND APPARATUS FOR ACCESSING DATA USING A CACHE

(75) Inventors: Jeffrey L. Alexander, Watertown, MA (US); Paul M. Bober, Lexington, MA (US); Rui Liang, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 353 days.

(21) Appl. No.: 09/845,385

(22) Filed: Apr. 30, 2001

(51) Int. Cl.⁷ .............................................. G06F 12/00
(52) U.S. Cl. ........................ 711/129; 711/119; 711/3; 711/4
(58) Field of Search ............................ 711/4, 111, 112, 711/116, 119, 120, 129, 202, 204–207, 221, 3

(56) References Cited

U.S. PATENT DOCUMENTS 5,590,300 A * 12/1996 Lautzenheiser ............. 711/202
6,138,225 A * 10/2000 Upton et al. ................ 711/207
6,173,360 B1 * 1/2001 Beardsley et al. .......... 711/111
6,557,073 B1 * 4/2003 Fujiwara et al. ............ 711/111

* cited by examiner

Primary Examiner—Matthew Kim
Assistant Examiner—Woo H. Choi
(74) Attorney, Agent, or Firm—Chapin & Huang, LLC; Barry W. Chapin, Esq.

(57) ABSTRACT

Mechanisms and techniques disclose a system that provides access to data using a two part cache. The system receives a data access request containing a first data reference, such as an open systems request to access data. The system then obtains a history cache entry from a history cache based on the first data reference and obtains a partition cache entry from a partition cache based on the first data reference. Cache entries contain mappings between open systems reference locations and non-open systems references to locations in the data to be accessed. The system then performs a data access operation as specified by the data access request using a second data reference based upon either the history cache entry or the partition cache entry. Upon performance of the data access operation, the system then updates the history and partition caches with new cache entries and can resize the partition and history caches as needed.

67 Claims, 9 Drawing Sheets

METHODS AND APPARATUS FOR ACCESSING DATA USING A CACHE

RELATED APPLICATIONS INCORPORATED BY REFERENCE

The present invention relates to co-pending U.S. patent application Ser. No. 09/479,512, entitled "METHODS AND APPARATUS FOR ACCESSING SHARED DATA", filed Jan. 7, 2000. This reference Patent Application is assigned to the assignee of the present invention. The entire teachings and contents of this reference Patent Application are hereby incorporated by reference in their entirety.

FIELD OF THE INVENTION

The present invention generally relates to data storage and data access systems, and more particularly, to systems and techniques which use a cache to provide access to data for applications that perform on computer systems.

BACKGROUND OF THE INVENTION

The ability of modern computer and data processing systems to share data has largely contributed to the popularity and rapid expansion of computer networking industries such as the Internet. In response to the insatiable demand to exchange data over networks or via other means, computer systems and software developers have created various conventional data sharing mechanisms to allow one or more computer systems to obtain access to data created, stored, or maintained by another computer system. Generally, computer systems that share data do so over a network using one or more standardized client/server protocols for the data exchange. Many such client/server protocols exist, examples of which include database access protocols, file sharing and file system protocols (e.g., the Network File System or NFS protocol developed by Sun Microsystems, Inc. of Mountain View, Calif., U.S.A.), and world wide web (WWW) based protocols. Using such mechanisms, two or more computer systems can share data that is stored in a format that each computer system can readily access. Other conventional data sharing systems have also been developed to allow two computer systems to have shared access to data from a commonly shared data storage device or data storage system that has a connection (either direct or over a network) to each computer system.

In some instances, certain computer systems create and manipulate data in a format that is natively different than data formats used by other computer systems. For example, conventional computer systems commonly referred to as "open systems" operate under the control of an open systems operating system such Unix (or a Unix variant) or Microsoft Windows (e.g., Windows 95, Windows 98 or Windows 2000), manufactured by Microsoft Corporation of Redmond, Wash., USA (Windows is a trademark of Microsoft Corporation). Such open-systems operating systems typically store data in files that conform to an "open systems" or "flat file" format. Generally, the open systems file format defines a format for data stored in a file as a continuous string or stream of bytes of data beginning at a certain location in storage (i.e., in memory or on disk) and continuing for a certain length or number of bytes in the storage medium (i.e., on disk or in memory). Open systems based computing systems thus don't interpret the contents of data such as a file maintained in storage by the operating system. Instead, applications are free to establish their own mechanisms for handling how the data is managed within files.

A software application operating on an open systems computing platform can provide a data access request to the open systems operating system that includes information that allows the operating system to process the data access request. For example, a "read" data access request might appear as follows: "read filename(offset, length)". In this example, the "filename" portion of the data access request specifies the name of a data (e.g., a file in this example) in storage and allows the operating system to find the beginning of the data. The "offset" portion of the data access request specifies a specific location (e.g., byte number) into the data at which the data access operation is to begin to be performed. For this example, the offset indicates where the read operation should begin in the data. The "length" portion of the data access request indicates how much data, beginning at the offset position, the operating system should access (e.g., should read in this example) on behalf of the application providing the data access request.

Other types of computer systems, such as mainframe computers, typically store data in files which are organized as record-based sets of data known as data sets. Unlike open systems computing platforms, a non-open systems computing platform such as a mainframe computer system operates applications that do not expect to have a need to directly access data based on byte offsets into the data. Instead, data records are more meaningful to such non-open systems applications. As such, each data set may have its own predefined format such as a fixed block format, a variable-block format or a VSAM format. The operating system (e.g., MVS) that operates on a mainframe computer system "understands" the predefined format for data stored by the mainframe computer system. Mainframe computer systems are often called "non-open systems" computer systems due to the proprietary data formats used to store data in such systems. Such non-open data formats do not readily allow the non-open systems data to be shared with other computer systems that use a standard open systems data format.

Applications that operate on mainframe computer systems can provide non-open systems data access requests to the mainframe operating system that indicate, for example, a specific record and/or specific block at which the data access is to take place. Record lengths can vary from one record to another within a single data set. Accordingly, to reference a specific byte of data at a given location within a data set, the non-open systems data access request must include the record number as well as a position within that record. However, as noted above, typical non-open systems applications require access to the entire record rather than to a specific byte of information within a record.

Software developers have created conventional software systems that can allow a software application operating on an open systems computing platform, such as a computer system running the Unix operating system, to access non-open systems data such as data stored within a mainframe data set. An example of such a software system is the InfoMover software system developed by EMC Corporation of Hopkinton, Mass., USA.

InfoMover operates in conjunction with an open systems operating system such as Unix to service open-systems data access requests which attempt to access mainframe data stored in mainframe data sets. In order to properly obtain access to the data in the mainframe data set at the proper location, InfoMover receives an open systems data access request and starts performing a seek access operation at the beginning of the mainframe data set containing the requested data. During the seek access operation, the InfoMover system counts the number of bytes in each sequential record within the mainframe data set, beginning at the start of the first record in the data set, and continues counting bytes until the desired open systems offset is reached in the data within the data set. At that point, InfoMover can access the data according to the data access request in order to provide data from the mainframe data set to the requesting open systems software application. Various aspects of the InfoMover software system are discussed in the U.S. patent application Ser. No. 09/479,512, entitled "METHODS AND APPARATUS FOR ACCESSING SHARED DATA", filed Jan. 07, 2000, which was incorporated by reference above.

SUMMARY OF THE INVENTION

Conventional techniques to allow open systems software applications to access non-open systems data, such as data stored in a mainframe data set, suffer from a variety of deficiencies. For example, a typical open systems data access request specifies an offset position within the data that is to be accessed that is relative from the beginning of the data and further specifies a length of data to be accessed (i.e., read, written, etc.) at the specified offset position. The open systems offset position has little relevance to a non-open systems record or block structure in which a typical mainframe data set is organized. As such, a conventional software application such as InfoMover that allows open systems applications to access data in a mainframe data set must process each open-systems data access request from the beginning of the mainframe data set in order to keep count of the total number of bytes that are "seeked" to until the desired position is reached in the data set that corresponds to the offset position specified in the open-systems data access request. Then the data access operation can be performed.

The InfoMover system must repeat this type of processing for each subsequent open systems data access operation that InfoMover receives. For large data sets in which the open systems data access operation specifies large offsets, seeking from the beginning of the data set to the desired offset position can be quite cumbersome and can require significant processing time in order to simply reach the desired location in the data set, at which point InfoMover must still then process the data access request at that location in the data.

The present invention significantly overcomes this type of problem that arises in conventional data sharing mechanisms, such as those described above. In particular, embodiments of the invention provide mechanisms and techniques that allow open systems computing platforms and software applications to more efficiently access non-open systems data. In embodiments of the invention, this is done by providing a unique cache mechanism that provides mappings between open systems file or data location references and corresponding non-open systems file or data location references. The cache mechanism includes a two-part caching system that includes a history cache and a partition cache.

Cache entries in the history cache represent mappings between open systems data locations (e.g., offsets) and corresponding relative non-open systems locations (e.g., record and/or block positions) in the non-open systems data (e.g., in a mainframe data set). Embodiments of the invention produce such cache entries as a result of processing open systems data access requests for access to the non-open systems data. The partition cache contains a predetermined number of successively indexed partition cache entries, each of which corresponds to a specific location range of data. An open systems to non-open systems location mapping contained in any particular partition cache entry thus contains a mapping between an open systems reference to data and a corresponding non-open systems reference to the data which "fall within" or "exist within" the location range assigned to a partition cache entry index assigned to that particular partition cache entry. For example, if an embodiment of the invention initially assumes that data to be accessed is two gigabytes in total size (i.e., from beginning to end) and the partition cache contains a predetermined number of partition cache entries, such as one thousand partition cache entries, then each partition cache entry represents a two megabyte slice or partition of the total data file or data set that can be accessed. A mapping between an open systems data location and a non-open systems data location that exists within a particular partition cache entry thus references data that exists within the location range associated to the index for that partition cache entry.

Using this architecture, according to the general operation of an embodiment of the invention, an open systems software application can provide an open systems data access request to a computer system equipped with the embodiment of the invention. The embodiment of the invention can use an offset or other open systems data reference (i.e., a first data reference) contained within the open systems data access request to select or otherwise obtain a history cache entry from within the history cache that most closely corresponds to a position within the data as specified by the open systems reference or offset (i.e., the first data reference) contained in the data access request. Preferably, a history cache entry that meets this criteria contains an open systems reference that is equal to or less than (i.e., exists at a location prior to) the offset position specified in the open systems data access request. In addition to selecting a "closest" history cache entry, the embodiment of the invention can also select or obtain a partition cache entry that has a partition cache entry index that corresponds to the location range in the data to which the offset (the first data reference) specified in the data access request corresponds. If this partition cache entry happens to not contain a mapping (i.e., is empty), then the embodiment of the invention can select the first non-empty partition cache entry that most closely precedes that empty partition cache entry in the partition cache.

With these two cache entries (i.e., the selected history cache entry and the selected partition cache entry), the embodiment of the invention can select or chose either the history cache entry or the partition cache entry that most closely corresponds to (e.g., is equal to or less than) the desired offset (the first data reference) at which the data access request is to be performed. The embodiment of the invention can then cause the computer system or other device to perform the data access request using the non-open systems location from the particular selected cache entry as a starting point in the data in order to seek to the desired offset or starting location as specified by the first data reference in the data access operation. This new starting location (i.e., the location which the embodiment "seeked" to using the selected history or partition cache entry as a non-open systems starting point) and a corresponding non-open systems reference which corresponds to this starting location (i.e., the position in the data set which was "seeked" to) can serve as a new mapping for a new cache entry to be placed into the history cache and the partition cache.

In addition, after completion of the data access operation as specified in the data access request (e.g., after reading data for a specified number of bytes), the embodiment of the invention can obtain an new ending location in the data that indicates the open and non-open systems positions at which the data access request was completed. This open systems ending location (i.e., the offset location at which the data access operation completed accessing the data) and its corresponding non-open systems reference (e.g., a record or block location) to the data which corresponds to this ending location can serve as a new ending location mapping for another new cache entry which can also be placed into the history cache, and possibly also into the partition cache.

In this manner, as the embodiment of the invention causes each data access operation to be performed, two new history cache entries can be created; a starting location history cache and an ending history cache entry. The first is created as a result of using an existing cache entry as a starting point and then seeking to a new starting location, which serves as the open systems reference for a new starting location history cache entry, and the second is created as a result of obtaining the ending locations at which the data access operation completed processing.

More specifically, the system of the invention provides method embodiments which generally provide access to data. The data may be stored in a non-open systems format such as in a mainframe data set or data file or in any other format. One method embodiment comprises the steps of receiving a data access request containing a first data reference. The data access request is preferably an open systems request to access the data stored in the non-open systems format and the first data reference can be, for example, an open systems offset specification to a location or position in the data. Alternatively, the data access request can be in any format that is not natively compatible with the format of in which the data is stored. That is, the invention can apply to systems in which data access requests are received in one format (e.g., using one addressing or data location scheme) for data which happens to be stored in another format, such as in another addressing scheme. A preferred example of this is data access requests received in an open systems format (e.g., conforming to Unix, Windows, or another open systems standard) that request access to data stored in a non-open systems format (conforming or arranged in a mainframe format, such as in a data set block or record format).

In operation, the method embodiment obtains a history cache entry from a history cache based on the first data reference and also obtains a partition cache entry from a partition cache based on the first data reference. The history cache entry and the partition cache entry can each contain a mapping between an open systems reference to a location in the data and a non-open systems reference to a location in the data. The method then performs (or causes to be performed) a data access operation on the data as specified in the data access request using a second data reference obtained from one of the history cache entry and the partition cache entry. The second data reference identifies a non-open system location in the data that corresponds closest to the first data reference. In this manner, two cache entries are obtained and compared to determine which is the most optimal (e.g., closest) for use in performing the data access operation.

In another embodiment, the data access request is a read request received from an open systems computer system to read the data which is non-open systems data (e.g., mainframe created data) at an open systems location specified by the first data reference. In this embodiment, the history cache and partition cache contain respective history cache entries and partition cache entries that contain mappings of open systems data locations in the data to non-open systems data locations in the data. These mapping thus map the first data reference to the second data reference. The step of performing uses a non-open systems data location in the data (i.e., the second data reference), as obtained from either the history cache entry or the partition cache entry, as a starting point in the data that is substantially close to a starting location in the data at which the data access operation is to be performed in order to then advance to the starting location in the data at which the data access operation is to be performed. The cache entries are thus "close" cache hits which provide a location in the data that is close to the desired offset (i.e., starting location) at which the data access operation is to actually begin.

In another embodiment, the history cache can include a plurality of history cache entries. Each history cache entry contains a mapping between an open systems reference to a location in the data and a non-open systems reference to a location in the data. Each history cache entry is obtained from a former data access operation to the data. In this embodiment, the step of obtaining a history cache entry includes the step of comparing the first data reference to each history cache entry in the history cache to select a selected history cache entry that is closest to the first data reference. In a preferred embodiment, that are a limited number of history cache entries, such as one hundred history cache entries. As such, this embodiment compares the first data reference to the open systems reference in each of the one hundred history cache entries to find the one closest to the first data reference.

In another embodiment, the step of obtaining selects the selected history cache entry from the plurality of history cache entries that contains an open systems reference that is closest to the first data reference and that is at least equal to or less than the first data reference. In other words, the history cache entry with the open systems reference that is closest without going over or exceeding the value of the first data reference is selected or obtained.

In yet another embodiment, the partition cache can include a plurality of partition cache entries. Each partition cache entry is capable of containing a mapping between an open systems reference to a location in the data and a non-open systems reference to a location in the data. Each partition cache entry also has a respective partition cache entry index corresponding to a respective location range within the data that is to be accessed. Thus, if a partition cache entry contains a mapping between an open systems reference to a location in the data and a non-open systems reference to a location in the data, the open systems reference in that partition cache entry corresponds to a location in the data that exists within (i.e., is within the bounds of) the location range corresponding to that partition cache entry index. Also in this embodiment, the step of obtaining a partition cache entry includes the step of selecting a selected partition cache entry that contains a mapping and that has a partition cache entry index that most closely corresponds to a location range within the data in which an open systems reference to a location in the data identified in the first data reference exists. Preferably the partition cache entry having the location range in which the first data reference exists is chosen. However, if this partition cache entry is empty (i.e., no mapping has yet been placed into this partition cache entry), then the first non-empty partition cache entry having the next closest, but lower, partition cache entry index is chosen as the selected partition cache entry.

In a further embodiment, the step of obtaining selects the selected partition cache entry from the plurality of partition cache entries that contains an open systems reference that is closest to the first data reference and that is either equal to or less than the first data reference.

In another embodiment of the invention, the step of performing a data access operation includes the steps of comparing the first data reference to an open systems reference in the history cache entry and comparing the first data reference to an open systems reference in the partition cache entry to select a selected cache entry from between the history cache entry and the partition cache entry that contains an open systems reference that is the closest to the first data reference. In other words, whichever one of the history or partition cache entries contains the closest location reference is used as the selected cache entry. Then this embodiment obtains, for use as the second data reference for performance of the data access operation, a non-open systems reference from the selected cache entry that contains the open systems reference that is the closest to the first data reference.

In another embodiment, the first data reference corresponds to an open systems starting location in the data at which the data access operation is to be performed and the open systems reference in each of the history cache entry and the partition cache entry correspond to open systems locations in the data obtained from formerly performed data access operations. Also, the step of comparing selects the selected cache entry from between the history cache entry and the partition cache entry that contains an open systems reference that is closest to the first data reference and that either equal to or less than the first data reference.

In still another embodiment, the open systems reference of the selected cache entry corresponds to a location in the data that is either the same as or is before the open systems starting location in the data corresponding to the first data reference at which the data access operation is to be performed.

In a further embodiment, the step of performing a data access operation includes the steps of computing a starting location for data access based upon: i) the first data reference from the data access request, ii) the open systems reference from the selected cache entry, and/or iii) the non-open systems reference from the selected cache entry. This method embodiment then provides access to the starting location in the data and performs the data access operation at the starting location in the data.

In one embodiment, the step of computing a starting location for data access comprises the step of computing the starting location for data access to be a location in the data corresponding to the non-open systems reference from the selected cache entry plus a difference between the first data reference and the location specified by the open systems reference from the selected cache entry. In other words, the selected cache entry provides a non-open systems reference which is a position "close" to the starting location. Then, using the difference between the first data reference (which specifies the true offset into the data, in open systems format, which the data access operation should begin) and the open systems reference in the selected cache entry, this embodiment can determine how far off or away the non-open systems reference (from the selected cache entry) is from the actual starting location. This difference is then added (i.e., by seeking ahead in the data, as will be explained) to the non-open systems reference from the selected cache entry to advance to the actual starting location in the non-open systems data.

Along these lines, in another embodiment, the step of providing access to the starting location in the data comprises the steps of beginning seek access to the data at a location specified by the non-open systems reference and continuing seek access to the data until the starting location for data access is reached. The amount by which to seek ahead towards, or advanced to, in the data beginning at the non-open systems reference can be determined by difference between the first data reference and the open systems reference in the selected cache entry. Generally then, the cache utilization techniques of this invention significantly improve data access times for accessing non-open systems data when receiving data access requests specifying an open systems format.

In another embodiment, in response to performing the data access operation, this method embodiment updates at least one history cache entry in the history cache with at least one new history cache entry. As will be explained, performance of a data access operation specified by a data access requests results in the ability of embodiments of the invention to obtain two (or more) new mappings between open system and non-open system data locations. Using these new mappings, new cache entries can be created in both the history and partition caches.

In one embodiment, the step of updating the history cache includes obtaining a non-open systems reference to the data which the step of performing uses to perform the data access operation on the data and obtaining an open systems reference to the data which the step of performing uses to perform the data access operation on the data. Then, this embodiment creates a new history cache entry. The new history cache entry contains a mapping between the one open systems reference to the data and the non-open systems reference to the data. There may be one or more than one new cache entry created in this manner.

In another embodiment, the method includes the step of creating a new partition cache entry using the history cache entry. In other words, the new history cache entry can also be placed into the partition cache.

In yet another embodiment, the steps of obtaining a non-open systems reference to data, obtaining an open systems reference to the data, and creating a new history cache entry are performed for starting locations in the data. The starting locations (an open systems location and a corresponding non-open systems location) are the positions in the data at which the data access operation is actually begun. In this embodiment then, the new history cache entry is a starting location history cache entry that contains a mapping between an open systems reference and a corresponding non-open systems reference that reflect a starting location for the data access operation in the data.

In a further embodiment, the steps of obtaining a non-open systems reference to data, obtaining an one open systems reference to the data, and creating a new history cache entry are repeated for ending locations in the data to create a second new history cache entry. The second new history cache entry is an ending location history cache entry that contains a mapping between an open systems reference and a corresponding non-open systems reference that reflect an ending location for the data access operation in the data. In other words, when the data access operation has completed, a open systems and non-open systems ending location are obtained which are used as another history cache entry.

In one embodiment, the method updates a partition cache entry in the partition cache using the starting location history cache entry. In another embodiment, the method updates a partition cache entry in the partition cache using the ending location history cache entry.

In a further embodiment, the history cache can contain a plurality of history cache entries, and each history cache entry can contain a mapping between an open systems reference to a location in the data and a non-open systems reference to a location in the data. Also in this embodiment, the steps of providing access to data are repeated such that the history cache is filled with history cache entries created in response to the performance of successive data access operations. When the history cache is filled with history cache entries, new history cache entries that are created as a result of further performance of successive data access operations replace existing history cache entries. In this manner, the history cache holds recently used mappings between open systems and non-open systems locations in the data.

In one embodiment, the step of updating at least one history cache entry in the history cache with at least one new history cache entry includes the step of replacing at least one existing history cache entry with a respective at least one new history cache entry.

In another embodiment, the step of replacing includes the step of selecting at least one existing history cache entry for replacement according to a history cache replacement scheme. A history cache replacement scheme is essentially an algorithm used to select which history cache entries are to be replaced when new history cache entries are created. Such a scheme can include a random replacement scheme, a least recently used replacement scheme, and a first in first out replacement scheme.

In another embodiment, the step of updating the partition cache includes obtaining a non-open systems reference to the data which the step of performing uses to perform the data access operation on the data. This may be, for example, the starting or ending non-open systems location in the data. The method then obtains an open systems reference to the data which the step of performing uses to perform the data access operation on the data. This may be, for example, the starting or ending open systems location in the data. The method then creates a new partition cache entry containing a mapping between the one open systems reference to the data and the non-open systems reference to the data. This new entry may be the same as (i.e., may be one of) the new starting or ending or other history cache entries, or may be a different entry containing different locations other than the starting or ending locations and other than location defined in the new history cache entries. For that matter, any open and non-open systems locations discovered during processing of the data access operation can be used to create history and/or partition cache entries.

In another embodiment, the step of creating a new partition cache entry includes the step of creating the new partition cache entry in a partition cache entry having a partition cache entry index that corresponds to a location range within the data in which an open systems reference to a location in the data as identified in the new partition cache entry exists. That is, the new entry is placed into a partition cache at a position having a partition cache index with an associated location range in which the open systems reference for that entries falls within (i.e., is within the bounds of).

In another embodiment, each successive partition cache entry represents a next successive location range for which that partition cache entry can contain a mapping of an open systems reference within that location range to a non-open systems reference in the data. In this embodiment, if a partition cache entry contains a mapping between an open systems reference to a location in the data and a non-open systems reference to a location in the data, the open systems reference in that partition cache entry corresponds to a location in the data that exists within the location range corresponding to that partition cache entry index.

In another embodiment of the invention, the data is assumed to be a predetermined size and the plurality of partition cache entries comprise a predetermined number of successively ordered partition cache entries, each having a partition cache entry index having a value corresponding to a respective location in the predetermined number of successively ordered partition cache entries. In such an embodiment, the location range associated with each partition cache entry is set to a value corresponding to the value of the partition cache entry index multiplied by a location range increment. The location range increment is equal to the predetermined size of the data divided by the predetermined number of partition cache entries.

In other words, the partition cache can be an array, for example, having a predetermined number of entries, such as 1000 entries, each capable of containing an individual mapping of an open systems location to a non-open systems location in the data. Embodiments of the invention can make an initial assumption of the size of the data. For example, the data may be assumed to be two gigabytes in size. The location range associated with each entry in this example is then the two gigabyte data size divided by the number of partition cache entries (1000), resulting in a two megabyte location range for each partition cache entry.

Another embodiment includes the steps of manipulating the partition cache to accommodate creation of a partition cache entry based on the data access request if the data access request includes a first data reference that references an open systems location in the data that is beyond the location range corresponding to the last partition cache entry index. In other words, if the initial size estimate of the partition cache entry is not accurate (e.g., is too big or small), then the partition cache can be altered to contain a proper location for a new entry.

In one embodiment, the partition cache is a former partition cache and the step of manipulating the partition cache includes the step of condensing the partition cache by: i) copying the former partition cache to a new partition cache containing new partition cache entries, ii) re-assigning a new location range to each partition cache entry index in the new partition cache, the new location range for each partition cache entry index being substantially twice a size of the location range assigned a corresponding partition cache entry having the same partition cache entry index value in the former partition cache; and iii) for each new partition cache entry in the new partition cache, selecting a mapping, if existent, from a single former partition cache entry for use as a mapping for the new partition cache entry, the mapping selected from a set of all former partition cache entries in the former partition cache that contain mappings having open systems references for locations that exist within the new location range for the new partition cache entry.

In another embodiment, the step of selecting a mapping, if existent, from a single former partition cache entry for use as a mapping for the new partition cache entry, selects a mapping having a highest location value for the open systems reference from the set of all former partition cache entries in the former partition cache that contain mappings having open systems references for locations that exist within the new location range for the new partition cache entry. In other words, if the new partition cache entry contains entries having location ranges that are, for example, twice the size of the former location ranges, then there can be two entries from the former partition cache that could each (i.e., either one) placed into a single new partition cache entry having the large location range. In one embodiment, the system selects the former entry having the highest valued open systems reference. In another embodiment, the system selects the former entry having the lowest valued open systems reference.

In yet another embodiment, the step of manipulating the partition cache to accommodate creation of a partition cache entry comprises the steps of adding successive additional partition cache entries onto the end of the partition cache and assigning a corresponding location range to each added partition cache entry until enough successive additional partition cache entries are added that contain corresponding location ranges in which the reference to an open systems location can exist. In other words, in an alternative embodiment of the invention, instead of reassigning location ranges to the same number of partition cache entries, new partition cache entries are added to the end of the existing partition cache, and each is assigned a successively higher location range until a partition cache entry is added that has a range covering the open systems location for the new entry to be added to the partition cache.

Other embodiments of the invention include a computerized device, such as a server computer system, workstation, data storage system, network device, or other type of computer system or device configured to process all of the aforementioned method operations disclosed herein as embodiments of the invention. In such embodiments, the computer system includes an interface, a memory system, a processor and an interconnection mechanism connecting the interface, the processor and the memory system. In such embodiments, the memory system is encoded with a cache manager application that when performed on the processor, produces a cache manager process that provides access to data by causing the computer system, under control of the cache manager process, to perform all of the method embodiments and operations explained herein as embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon to provide a technique for accessing data as explained herein. The computer program logic, when executed on at least one processor with a computing system, causes the processor to perform the processing operations (e.g., the methods) indicated herein as embodiments of the invention. Such arrangements of the invention are typically provided as software, code and/or other data arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within the EMC Info-Mover software application that provides access to non-open system data on behalf of open systems which request such access. InfoMover is manufactured by EMC Corporation of Hopkinton, Mass., USA.

Also, it is to be understood that other types of devices, such as data storage systems, can operate according to, and can be configured with embodiments of the invention. That is, it is not required that the techniques explained herein operate within a computer system such as a server running an open systems operating system. Instead, in such other embodiments, a data storage system such as one of the Symmetrix line of data systems produced by EMC Corporation can contain operational software code, logic and/or circuitry to carry out the processing of embodiments of the invention as explained herein. In such embodiments, the data access request in an open systems format may be directly received by the data storage system from a device such as a computer system coupled to the data storage system. The data storage system can thus operate a cache manager as explained herein and can maintain the history and partition caches locally, within a memory system (e.g., a cache memory system) within the data storage system. The data storage system can also store the data (e.g., in non-open systems format) locally with storage devices such as disk drives that are also contained within and that operate in the data storage system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
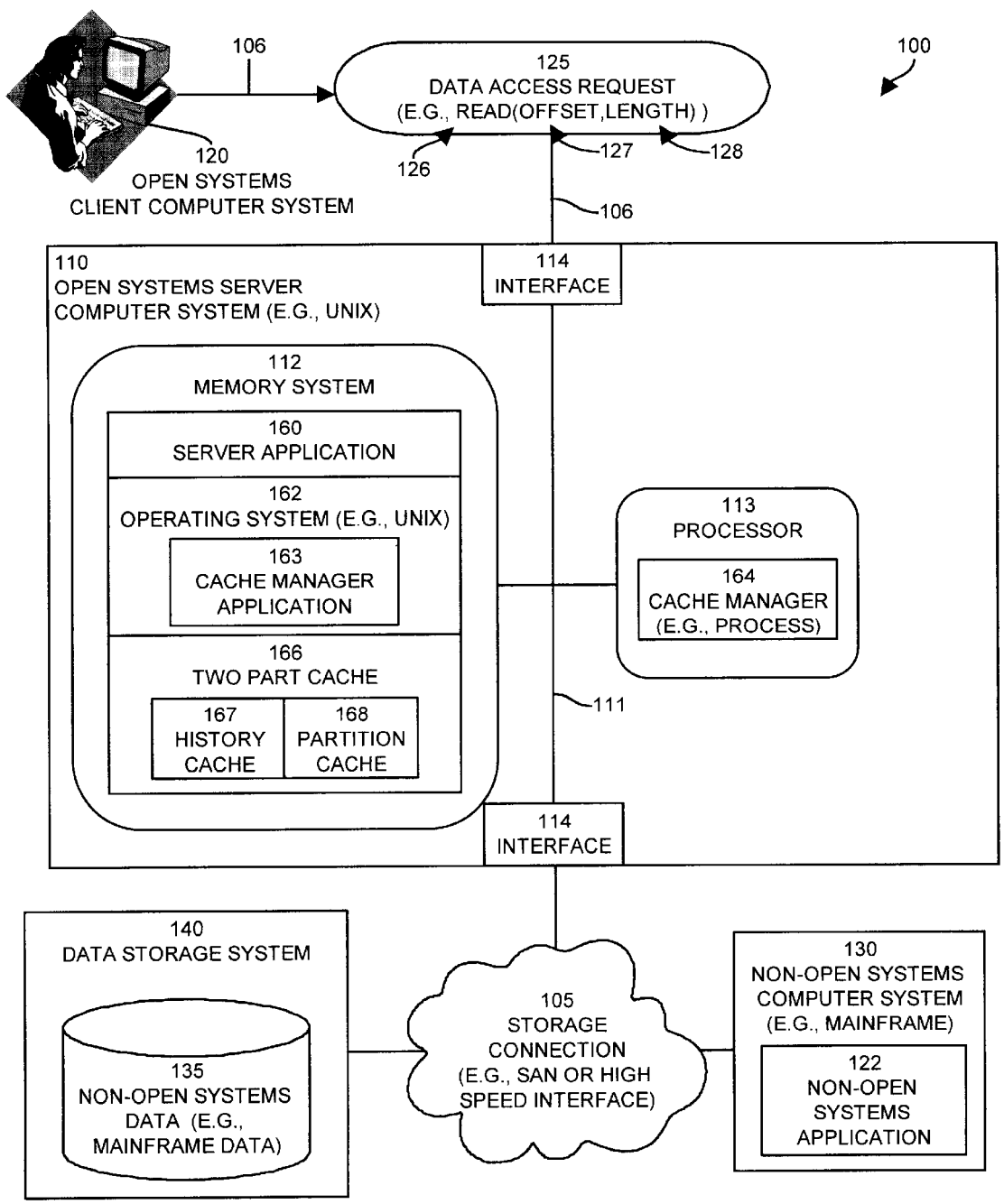
FIG. 1 illustrates an example computing system environment including a server computer system equipped with a cache manager application and process configured in accordance with embodiments of the invention.

Embodiments of the invention provide mechanisms and techniques that allow open systems computing platforms and software applications to more efficiently access non-open systems data. In embodiments of the invention, this is done by providing a unique cache mechanism that provides mappings between open systems file or data location references and corresponding non-open systems file or data location references. The cache mechanism includes a two-part caching system that includes a history cache and a partition cache.

Cache entries in the history cache represent mappings between open systems data locations (e.g., offsets) and corresponding relative non-open systems locations (e.g., record and/or block positions) in the non-open systems data (e.g., in a mainframe data set). Embodiments of the invention produce such cache entries as a result of processing open systems data access requests for access to the non-open systems data. The partition cache contains a predetermined number of successively indexed partition cache entries, each of which corresponds to a specific location range of data. An open systems to non-open systems location mapping contained in any particular partition cache entry thus contains a mapping between an open systems reference to data and a corresponding non-open systems reference to the data which "fall within" or "exist within" the location range assigned to a partition cache entry index assigned to that particular partition cache entry. For example, if an embodiment of the invention initially assumes that data to be accessed is two gigabytes in total size (i.e., from beginning to end) and the partition cache contains a predetermined number of partition cache entries, such as one thousand partition cache entries, then each partition cache entry represents a two megabyte slice or partition of the total data file or data set that can be accessed. A mapping between an open systems data location and a non-open systems data location that exists within a particular partition cache entry thus references data that exists within the location range associated to the index for that partition cache entry.

Using this architecture, according to the general operation of an embodiment of the invention, an open systems software application can provide an open systems data access request to a computer system equipped with the embodiment of the invention. The embodiment of the invention can use an offset or other open systems data reference (i.e., a first data reference) contained within the open systems data access request to select or otherwise obtain a history cache entry from within the history cache that most closely corresponds to a position within the data as specified by the open systems reference or offset (i.e., the first data reference) contained in the data access request. Preferably, a history cache entry that meets this criteria contains an open systems reference that is equal to or less than (i.e., exists at a location prior to) the offset position specified in the open systems data access request. In addition to selecting a "closest" history cache entry, the embodiment of the invention can also select or obtain a partition cache entry that has a partition cache entry index that corresponds to the location range in the data to which the offset (the first data reference) specified in the data access request corresponds. If this partition cache entry happens to not contain a mapping (i.e., is empty), then the embodiment of the invention can select the first non-empty partition cache entry that most closely precedes that empty partition cache entry in the partition cache.

With these two cache entries (i.e., the selected history cache entry and the selected partition cache entry), the embodiment of the invention can select or chose either the history cache entry or the partition cache entry that most closely corresponds to (e.g., is equal to or less than) the desired offset (the first data reference) at which the data access request is to be performed. The embodiment of the invention can then cause the computer system or other device to perform the data access request using the non-open systems location from the particular selected cache entry as a starting point in the data in order to seek to the desired offset or starting location as specified by the first data reference in the data access operation. This new starting location (i.e., the location which the embodiment "seeked" to using the selected history or partition cache entry as a non-open systems starting point) and a corresponding non-open systems reference which corresponds to this starting location (i.e., the position in the data set which was "seeked" to) can serve as a new mapping for a new cache entry to be placed into the history cache and the partition cache.

In addition, after completion of the data access operation as specified in the data access request (e.g., after reading data for a specified number of bytes), the embodiment of the invention can obtain an new ending location in the data that indicates the open and non-open systems positions at which the data access request was completed. This open systems ending location (i.e., the offset location at which the data access operation completed accessing the data) and its corresponding non-open systems reference (e.g., a record or block location) to the data which corresponds to this ending location can serve as a new ending location mapping for another new cache entry which can also be placed into the history cache, and possibly also into the partition cache.

In this manner, as the embodiment of the invention causes each data access operation to be performed, two new history cache entries can be created; a starting location history cache and an ending history cache entry. The first is created as a result of using an existing cache entry as a starting point and then seeking to a new starting location, which serves as the open systems reference for a new starting location history cache entry, and the second is created as a result of obtaining the ending locations at which the data access operation completed processing.

It is to be understood that embodiments of the invention can apply to systems in which data access requests are received in one format (e.g., using one addressing or data location scheme) for data which happens to be stored in another format, such as in another addressing scheme. A preferred example of this is in systems that receive data access request in an open systems format (e.g., conforming to Unix, Windows, or another open systems standard) that request access to data stored in a non-open systems format (conforming or arranged in a mainframe format, such as in a data set block or record format). In such systems, embodiments of the invention can greatly improve the efficiency of access to the non-open systems data.

FIG. 1 illustrates an example of a computing system environment 100 that is suitable for use in explaining the operation of example embodiments of the invention. The computing system environment 100 includes interconnections 105, 106 which couple an open systems server computer system 110, an open systems client computer system 120, a non-open systems computer system 130 (e.g., a mainframe) and a data storage system 140. The interconnection 106 may be any type of network medium such as a high-speed data communications medium (e.g., Ethernet, optical network, or other type of network). The interconnection 105 may be a storage connection such as a storage area network or a high speed data or peripheral interface (e.g., Small Computer Systems Interface or SCSI interface, Fibre-channel interface, ESCON interface or the like) which allows the open systems server computer system 110 and the non-open systems computer system 130 to access non-open systems data 135 (e.g., mainframe data) which the data storage system 140 stores within one or more storage devices (e.g., disk drives).

The non-open systems computer system 130 which may be a mainframe for example, performs (i.e., executes or otherwise operates) a non-open systems application 122 which generates the non-open systems data 135. As such, the non-open systems data 135 is arranged in a data format that is not natively understandable by the server computer system 110. Preferably, the non-open systems data 135 is a mainframe data set arranged according to a non-open systems data format such as a record format, block format (fixed or variable), VSAM format or another format.

The open systems server computer system 110 (hereinafter server computer system 110) includes an interconnection mechanism 111 which couples the memory system 112, a processor 113 and one or more input-output interfaces 114. The server computer system 110 may be any type of computerized device or system such as a workstation, personal computer, mini-computer, portable computing device or the like. In this example, the server computer system 110 operates as an open systems server to provide access to the non-open systems data 135 maintained within the data storage system 140 to open systems client computer systems 120 that request such access to the non-open systems data 135 via data access requests 125.

In the server computer system 110, the memory system 112 is encoded with logic instructions and/or data that include a server application 160, an operating system 162 such as a Unix variant, a cache manager application 163 configured according to embodiments of the invention, and a two-part cache 166 that includes a history cache 167 and a partition cache 168. In this example embodiment, the cache manager application 163 operates in conjunction with the operating system 162 and is therefore shown as residing in the memory system 112 within the operating system 162. The operating system 162 to be any type of operating system such as variant of Unix or Microsoft's Windows operating system. In this example, the operating system is an open systems operating system.

The cache manager application 163 represents software code, data and/or logic instructions (e.g., stored in the memory system 112 or on another computer readable medium such as a disk) that embody the processing functionality of embodiments of the invention. The processor 113 can access the memory system 112 via the interconnection mechanism 111 in order to launch, run, execute, interpret or otherwise perform the logic instructions of the cache manager application 163 in order to produce the cache manager process 164 (generally referred to herein as the cache manager 164). In other words, the cache manager 164 represents one or more portions of the cache manager application 163 (or the entire application 163) performing within or upon the processor 113 in the server computer system 110.

Is to be understood that embodiments of the invention include the cache manager application 163 (i.e., the un-executed or non-performing logic instructions and/or data) encoded within a computer readable medium such as a floppy disk, hard disk or in an optical medium, or in a computer readable medium such as memory type system such as in firmware, read only memory (ROM), or, as in this example, as executable code within the memory system 112 (e.g., within random access memory or RAM), and that other embodiments of the invention comprise the cache manager 164 operating within or on the processor 113 which may be a general purpose microprocessor or may be a dedicated Application Specific Integrated Circuit (ASIC). It is also to be understood that the cache manager application 163 is not required to be part of the operating system 162 but rather, can operate anywhere within the server computer system 110, or within another system accessible to the server computer system 110 for that matter. While not shown in this example, those skilled in the art will understand that the computer system 110 may include other processes and/or software and hardware components, which have been omitted from this illustration for ease of description of the invention.

Prior to discussing the details of operation of the cache manager 164, some details concerning the formats of a data access request 125, the history cache 166 and partition cache 168 will be provided next for ease in understanding the operation of the invention.

Figure 2:
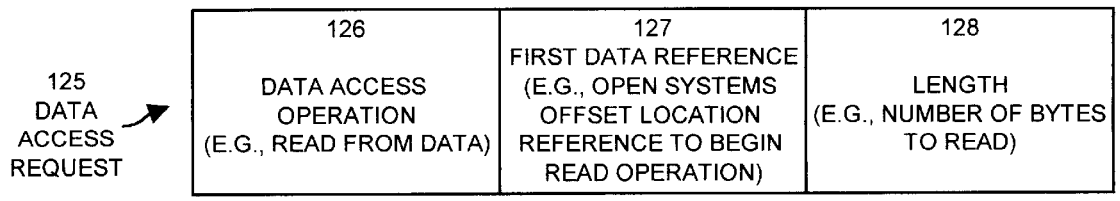
FIG. 2 illustrates a simple example format of a open systems data access request used by embodiments of this invention.

FIG. 2 illustrates a simple example of a format for a data access request 125. Generally, the data access request 125 is an open systems request to access the data 135, which happens to be stored in a non-open systems format. The data access request 125 includes a data access operation 126, a first data reference 127 and a length field 128. The data access request 125 need not be "aware" that the data 135 is stored in a non-open systems format. In other words, the data access request 125 requires no special formatting and the client computer system 120 that provides the data access request 125 does not need to "understand" or know that data 135 being operated upon by the data access request 125 is stored in a non-open systems format. Rather, the client computer system 120 simply treats the data 135 as a file of data accessible using standard open systems techniques.

Within the data access request 125, the data access operation 126 specifies a particular operation that is to be carried out upon specific data which is identified by a data file name or file pointer or file descriptor (not shown in this example). As a specific example, the data access operation 127 may contain a write or read operation (e.g., a system call) to write or read to or from the non-open systems data 135. The first data reference 127 specifies, for example, an open systems offset location reference into the data 135 at which to begin the data access operation 126. In this example, the first data reference 127 may be an open systems offset location (e.g., a UNIX file offset) at which to begin the read operation on the non-open systems data 135. The length field 128 specifies the number of bytes of non-open systems data 135 upon which the data access operation 126 is to be performed. In this example, the length field 128 can specify the number of bytes to read beginning at the specific offset location identified by the first data reference 127.

Figure 3:
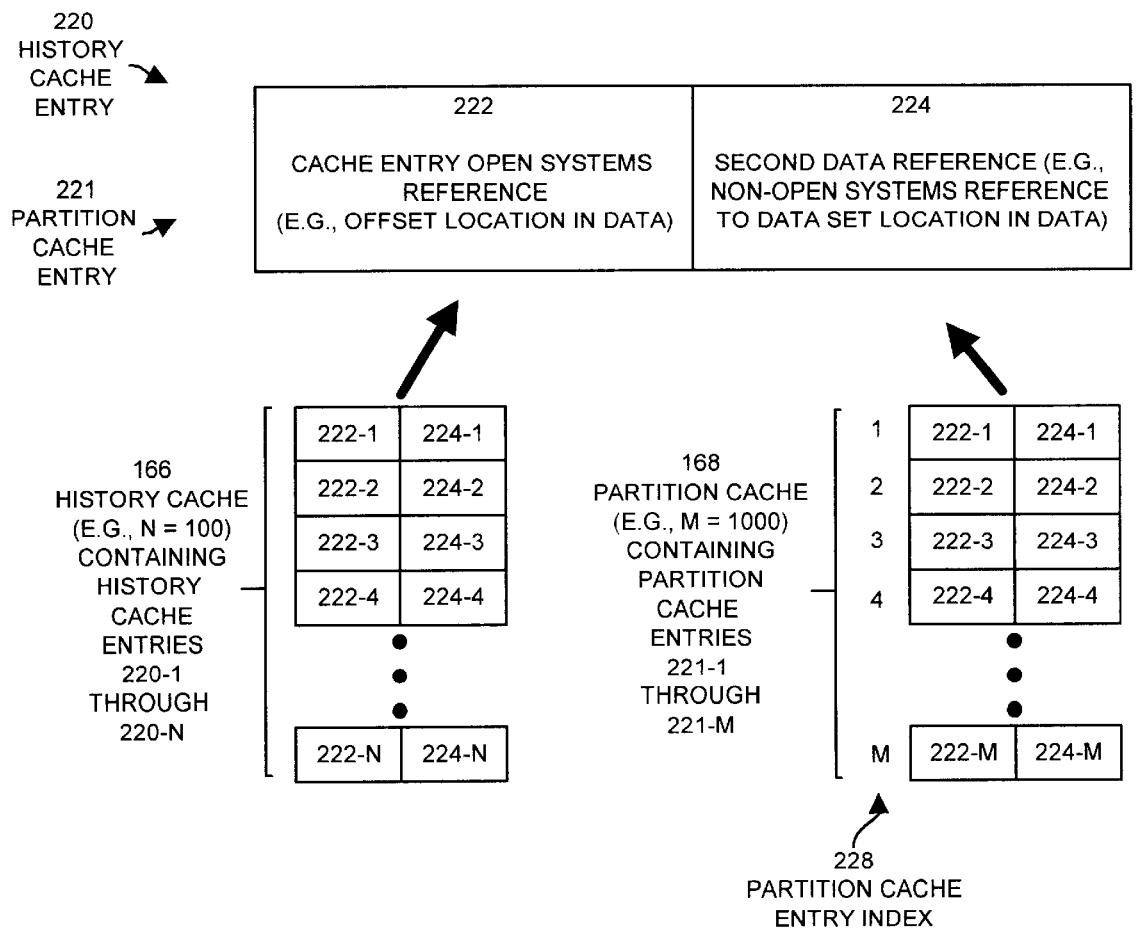
FIG. 3 illustrates an example of the structure of a history cache and a partition cache as configured according to one example embodiment of the invention.

FIG. 3 illustrates an example architecture of a history cache 166 and partition cache 168, as well as details of the contents of a history cache entry 220 and a partition cache entry 221 configured in accordance with preferred embodiments of the invention.

The history cache 166 contains a plurality of history cache entries 220. In a preferred embodiment of the invention, there may be, for example, one hundred history cache entries 220 within the history cache 166. In a similar manner, the partition cache 168 contains a plurality of partition cache entries 221. It is noted that in this example embodiment, the format of a history cache entry 220 is the same as the format of the partition cache entry 221. The preferred embodiment of the invention, there may be, for example, one thousand partition cache entries 221 within the partition cache 168.

Each of the history and partition cache entries 220, 221 includes a mapping between an open systems reference 222 to a location in the data 135 and a corresponding second data reference 224 containing a non-open systems reference to that same location in the data 135. In other words, the open systems reference 222 is an offset, expressed in open system format such as a byte offset, to a location within the non-open systems data 135 and the second data reference 224 is that same location 222, but is expressed in non-open systems compatible format, such in block or record or VSAM format. The history cache entries 220 and partition cache entries 221 are thus expressed as location pairs 222, 224.

The specific details for creation of the history and partition cache entries will be explained shortly. For purposes of the explanation in FIG. 3, that cache manager 164 obtains the history cache entries 220 that exist within the history cache 166 from recently processed (i.e., former) data access operations to the data 135 which the cache manager 164 processed (or caused to occur) in the past. In other words, the cache manager 164 can cause a data access operation 126 to be performed in response to receiving a data access request 125 as will be explained, and as a result, one or more new history cache entries 220 are created from performance of the data access operation 126. Embodiments of the invention store these new history cache entries 220 in the history cache 166.

With respect to the partition cache 168, each partition cache entry 221 has a respective partition cache entry index 228 which corresponds to a respective location range, such as a range of open system byte offsets or addresses, that embodiments of the invention initially assume to exist within the data 135. As explained in the note in FIG. 3, embodiments of the invention can initially assume the non-open systems data 135 is a predetermined size, such as two gigabytes. This assumption may be based, for example, on a statistical average size of files containing non-open systems data 135 that are accessed over long periods of time. Using this assumption, embodiments of the invention can assign an initial location range to each partition cache entry 221 within the partition cache 168. This aspect of the invention is illustrated in FIG. 4.

Figure 4:
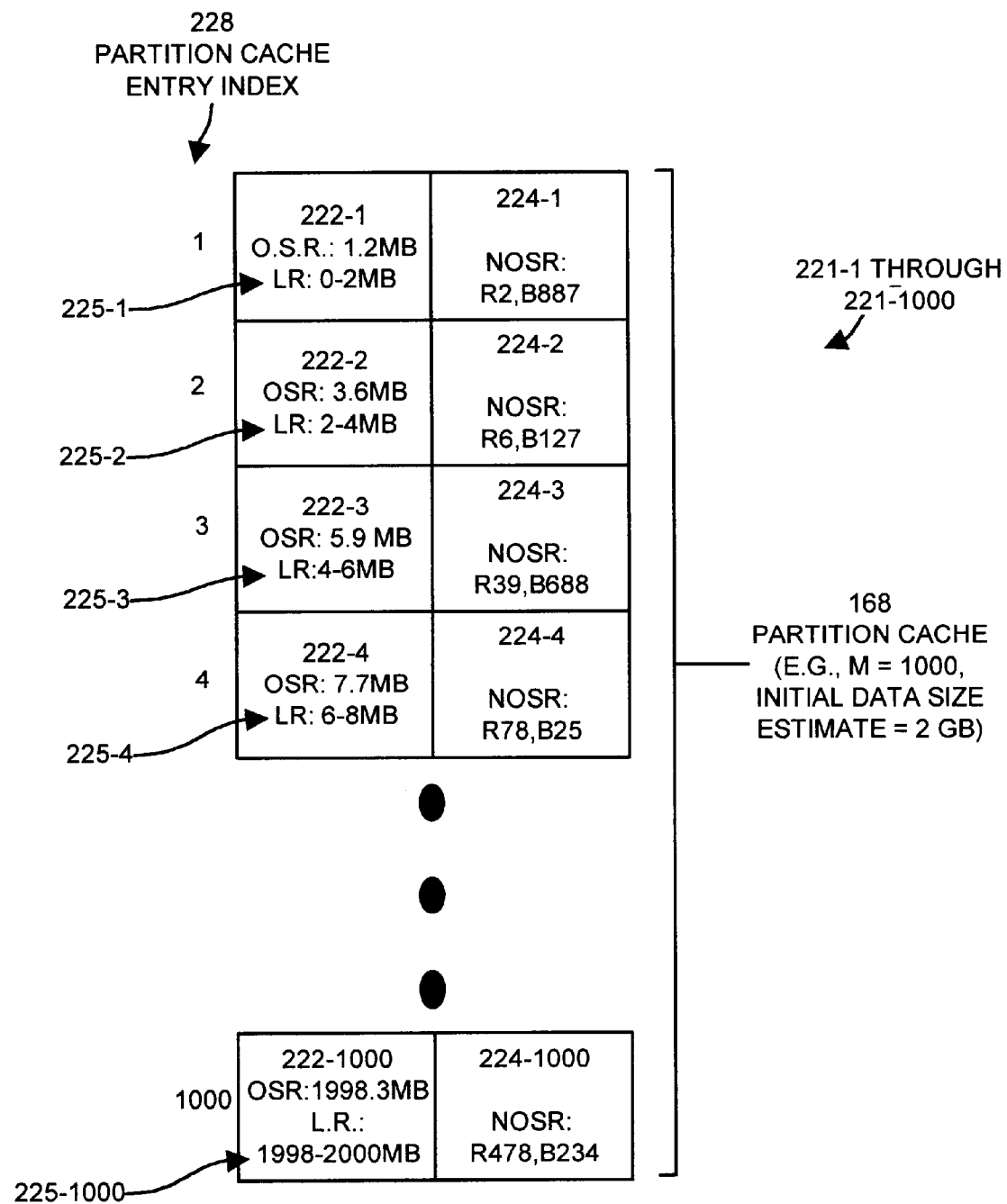
FIG. 4 illustrates a more detailed arrangement of a partition cache configured according to one embodiment of the invention.

FIG. 4 illustrates a more detailed example of the contents and location ranges 225 associated with partition cache entries 221 in the partition cache 168. In this example, the sample contents of the first four partition cache entries (i.e., partition cache entries corresponding to partition cache entry indexes 1 through 4) as well as the last partition cache entry (having a partition cache entry index value of 1000) are shown. Each illustrated partition cache entry 221 contains an example location value for the open systems reference 222 as well as an example corresponding location value for the non-open systems reference 224. In this example, the open systems references 222 are expressed in an open systems location format as positions or byte offsets (e.g., 5.9 MB) into the data 135 as measured from the beginning of the data 135, whereas the non-open systems references are expressed in an example (i.e., hypothetical) non-open systems format as a record (e.g., RX, where X is the record number) location and a block (e.g., BY, where Y is the block number) location within that specific record. By way of a specific example, the partition cache entry 221-4 (not specifically labeled) having a partition cache entry index value of four (4) contains an open systems reference 222-4 having a location value of 7.7 megabytes, and a corresponding non-open systems reference 224-4 location value of Record-78 (expressed as R78), Block-25 (expressed as B25). In other words, the information (e.g., a specific byte) which is located 7.7 megabytes from the beginning of the data set 135 (the open systems reference format to this byte of information) can be accessed at the non-open systems formatted location of R78, B25. It is to be understood that this is an example only, and that other non-open systems data location information may be included in such non-open systems references as well, such as track numbers or track locations. For example, in mainframe data sets, a track number may be used as part of a reference to data set information. A track is a typically a fundamental unit recognized by storage hardware on mainframe computer systems. Tracks may include a number of different records and a record may include multiple blocks. In any event, this example is illustrative only and is not meant to be illustrative of all embodiments of the invention. As such, track numbers are not used in this example due to drawing size space limitations.

Each partition cache entry location pair (222-1, 224-1), (222-2, 224-2), and so on also includes an associated partition cache entry index 228 that defines a specific respective location range (L.R.) 225-1, 225-2, and so forth. The location range 225 for a particular partition cache entry 221 defines the open systems location range (e.g., a range of addresses or offsets within the data 135) in which an open systems reference 222 must exist in order to be stored as a mapping in that particular partition cache entry 221 location pair 222, 224. The particular location range 225 calculated and assigned to each partition cache entry 221 depends upon the predetermined number of possible partition cache entries 221 (number of possible location pairs 222, 224 which is 1000 in this example) that can exist in the partition cache 168, as well as on the assumed size of the data 135 to which those location ranges 225 relate, which is two gigabytes in this example.

With respect to the partition cache 168 in FIG. 4, if the partition cache 168 can store one thousand possible filled partition cache entries 221 (i.e., each entry containing an open systems reference 222 mapped to a non-open systems reference 224), and embodiments of the invention make the assumption that the non-open systems data 135 (i.e., the mainframe data set) is a total of two (2) gigabytes in size, then each partition cache entry index 228 represents a two megabyte range or slice of possible offset locations within the data 135. Expressed as a formula, the location range for a particular partition cache entry index X is:

LOCATION RANGE=ASSUMED DATA SIZE/NUMBER OF PARTITION CACHE ENTRIES

As such, if a partition cache entry 221 contains a mapping of an open systems reference 222 for an open systems location in the data 135 to a non-open systems reference 224 for a non-open systems location in the data 135, the open systems reference 222 in that particular partition cache entry 221 will correspond to an open systems location (e.g., an offset) in the data 135 that exists or that falls within the location range corresponding to, or assigned to, that partition cache entry's 221 partition cache entry index 228.

As a specific example which further illustrates this point, the location pair 222-1, 224-1 for the first partition cache entry 221-1 is assigned a location range 225-1 that ranges from zero to two megabytes. The example open systems reference 222-1 for this partition cache entry has a value of 1.2 megabytes. This value (1.2 MB) represents a particular open systems offset location within the non-open systems data 135 to which the non-open systems reference 224-1 containing the value "R2,B887" (for Record 2, Block 887) corresponds, and this value (1.2 MB) also falls within, or exists in the range from zero (0) to two (2) megabytes of the data 135.

Returning attention now back to FIG. 1, according to the general operation of the server computer system 110, the open systems client computer system 120 provides a data access request 125 over the network medium 106 to the server application 160 operating within the server computer system 110 (server process not specifically shown). The data access request 125 specifies a particular data access operation 126 to be performed by the server application 160 on the non-open systems data 135 beginning at a particular open systems location (e.g., offset) indicated by a first data reference 127, and which is to continue for a particular length 128 (i.e., for a certain number of bytes). An example of such a data access request 125 is a data access operation 126 to read or write data at a particular open systems offset location 127 and for a particular length 128 (e.g., number of bytes) within the non-open systems data 135. Such a data access request 125 may be a Network File System (NFS) read, write or other type of NFS request to access the non-open systems data 135. A typical NFS read data access request 127 might specify to read 126 a thirty two (32) kilobyte block of data (i.e., the length portion 128 of the request) located at a specific byte offset location (the open systems offset portion 127 of the request) within the non-open systems data 135.

To service such a data access request 125, the server application 160 passes the data access request 125 (e.g., read(offset, length) ) to the operating system 162. At this point, the operating system 162 determines that the data access request 125 is for data 135 in a non-open systems format and invokes the functionality of the cache manager 164 in order to handle the data access request 125 according to the operation of embodiments of the invention as explained herein.

Figure 5:
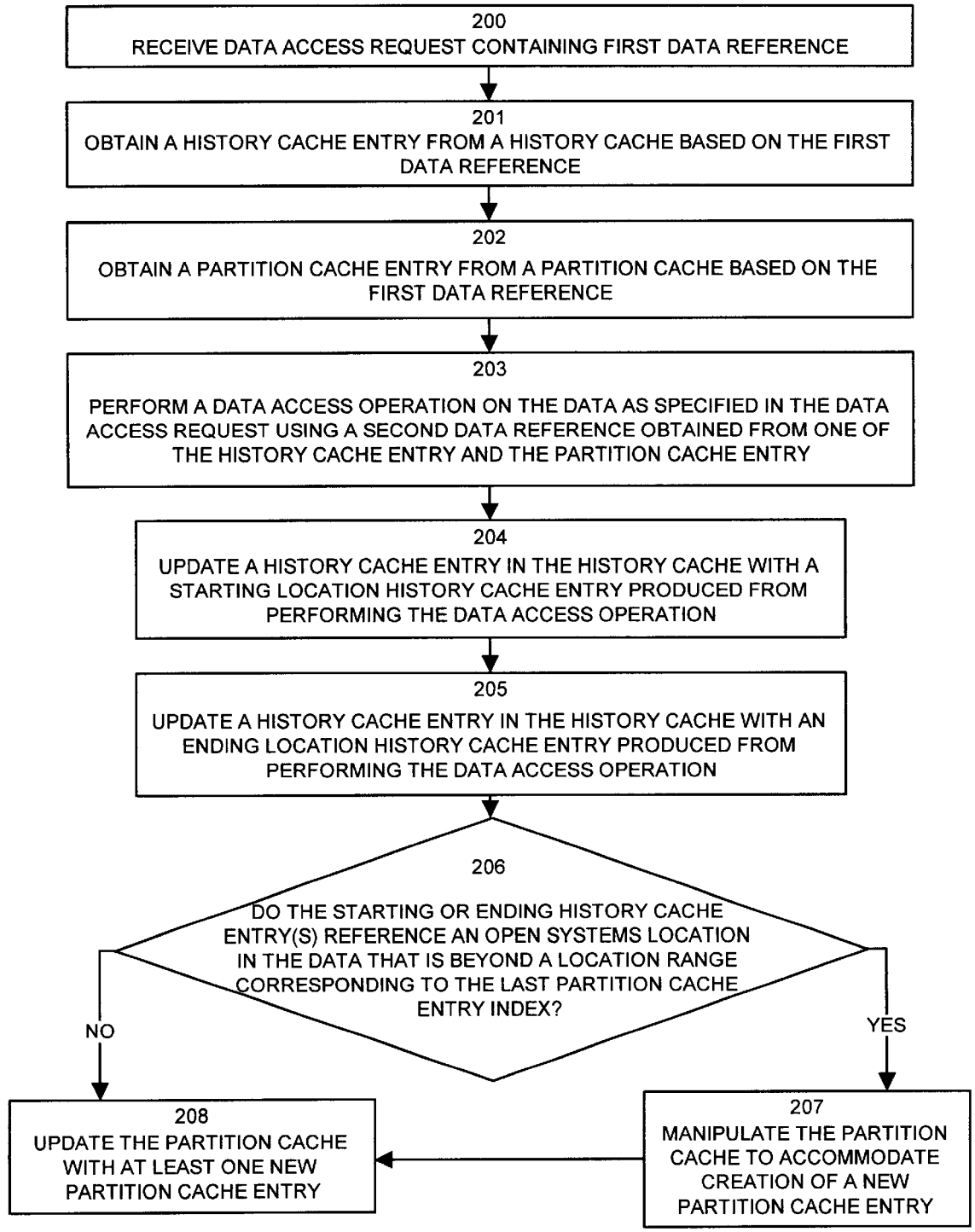
FIG. 5 is a flow chart of processing steps performed by a cache manager application and process configured according to embodiments of the invention.

FIG. 5 is a flow chart of processing steps which the cache manager 164 performs according to one embodiment of the invention when the server computer system 110 receives a data access request 125 for access to non-open systems data 135.

In step 200, the cache manager 164 receives the data access request 125 containing a first data reference. In this example embodiment of the invention (FIG. 1), the cache manager 164 receives the data access request 125 from operating system 162.

Preferably, the cache manager 164 maintains a distinct history cache 167 and partition cache 168 for each different file of data 135 (e.g., each data set) for which data access requests 125 are received. In other words, the open systems reference is 222 and non-open systems reference 224 refer to locations in the data 135 that are relevant to only that specific data set or file 135. If the cache manager 164 receives multiple data access requests 125 for different data sets 135, the cache manager 164 can create and maintain respective history and partition caches 167, 168 for use in processing each data access request 125 for the respective multiple data sets 135.

Next, in step 201, the cache manager 164 obtains a history cache entry 220 (a location pair 222, 224) from the history cache 167 based on the first data reference 127 contained within the data access request 125. As noted above, the first data reference 127 may be, for example, a desired open systems byte offset location to a position in the non-open systems data 135 (e.g., which may be treated as a file) at which to begin the data access operation 126. Using the first data reference 127, the cache manager 164 preferably selects a history cache entry 220 from the history cache 167 that is closest (without exceeding) to the first data reference 127.

In step 202, the cache manager 164 obtains a partition cache entry 221 from the partition cache 168 based upon the first data reference 127. As explained above, the first data reference 127 defines or specifies a desired open systems offset location within the non-open systems data 135 at which the data access operation 126 is to be performed. Assuming for this example that the first data reference 127 is not greater than two gigabytes, then this first data reference 127 will reside, exist or fall somewhere within one of the location ranges 125-1 through 125–1000 associated with a particular partition cache entry index 228 (FIG. 4), since these location ranges 125 collectively span the entire two gigabyte estimated (i.e., assumed) length of the data 135. Using this information, the cache manager 164 in step 202 can obtain the appropriate partition cache entry 221 (location pair 222, 224) from the partition cache 168 that corresponds to the first data reference 127 based on the location range for that partition cache entry 221.

Next, in step 203, the cache manager 164 performs the data access operation 126 on the data 135 as specified in the data access request 125 using a second data reference 224 (i.e., a non-open systems location reference) obtained from either (i.e., one of) the history cache entry 220 (obtained in step 201) or the partition cache entry 221 (obtained in step 202). Preferably, the history or partition cache entry 220 or 221 that contains an open systems reference 222 that is closest without exceeding to the first data reference 127 is selected as the cache entry to provide the second data reference 224 for use of performing the data access operation 126 on the data 135.

As briefly noted above and as will be explained in more detail shortly, the operation of performing the data access operation 126 includes using the second data reference 224 from the selected cache entry (220 or 221) as a beginning location in the data 135 from which to begin "seeking to" to obtain or otherwise arrive at an actual starting location for performance of the data access operation 126. In other words, unless the cache entry 220, 221 used as a basis for performance of the data access operation 126 coincidentally happens to contain the precise location at which the data access operation is to begin, the cache manager 164 uses the cache entry 220 or 221 as a basis for performance of the data access operation 126 to provide a location which is closer in proximity to the desired starting location (i.e., to the desired offset of the first data reference 127) than having to start at the beginning of the data 135 and seeking to the desired first data reference 127. As such, the cache manager 164 must typically further seek into the data 135 beginning at the non-open systems location specified by the second data reference 224 until the proper location is reached the corresponds to the first data reference 127.

As a result of this processing, the cache manager 164 becomes aware of a new non-open systems location in the data (i.e., the starting location at which the data access operation 126 is to be performed) as well as a corresponding open systems location in the data. Furthermore, upon completion of the data access operation 126, the cache manager 164 also becomes aware of open systems and non-open systems ending locations within the data 135 which indicate the last position in the data 135 to which access was made during performance of the data access operation 126. Stated differently, after completion of performance of the data access operation, the cache manager 164 is aware of two new location pairs 222, 224 that map open systems to non-open systems locations in the data 135 and that can be used to create new cache entries 220, 221.

As such, in step 204, the cache manager 164 updates (i.e., creates anew, or overwrites, as will be explained) a history cache entry 220 in the history cache 167 with a new starting location history cache entry 220 produced from performing the data access operation. In other words, in step 204, the cache manager 164 uses a mapping that was produced as a result of seeking to the starting location for performance of the data access operation 126 as a new history cache entry 220.

Next, in step 205, the cache manager 164 updates (i.e., creates anew, or overwrites, as will be explained) a history cache entry 220 in the history cache 167 with a new ending location history cache entry 220 produced from completion of performance of the data access operation. In other words, step 205, the cache manager 164 uses the mapping that was produced as a result of completing performance of the data access operation 126 thus providing ending locations for another new history cache entry 220.

Next, in step 206, the cache manager 164 determines if the new starting or ending history cache entries reference an open systems location (i.e., contained in open systems reference 222) in the data 135 that is beyond (i.e., greater than) the location range 225-M (225–1000 in the example partition cache 168 in FIG. 4) of the last partition cache entry index M (index 1000 in FIG. 4). In other words, in step 206, the cache manager 164 determines if the initial two gigabyte estimate for the size of the data set 135 has been exceeded by a reference (e.g., an open system offset 222) to the data 135 at a location beyond the two gigabyte position within the data 135. If this occurs, then the assumed two gigabyte size for the data is inaccurate, and hence the location ranges 225 for each partition cache entry index 220 must be adjusted. If this occurs in step 206, processing proceeds to step 207.

In step 207, the cache manager 164 manipulates the partition cache 168 (as will be explained in detail later) in order to accommodate creation of a new partition cache entry 221. Manipulation of the partition cache can take place in a variety of ways according to alternative embodiments of the invention. As will be explained in detail later, one technique of manipulating the partition cache 168 involves doubling the assumed size of the data 135 (e.g., from 2 GB to 4 GB) and then reassigning (i.e., recalculating) location ranges 225 for the partition cache entry indexes 228 and then collapsing, condensing or otherwise combining the existing partition cache entries 221 (i.e., location pairs 222 and 224) into the new partition cache 168. After manipulating the partition cache to accommodate creation of a new partition cache entry in step 207, processing proceeds to step 208.

In step 208, the cache manager 164 updates the partition cache 168 with at least one new partition cache entry 221. In one embodiment, the cache manager 164 uses the starting location history cache entry (updated within the history cache 167 in step 204) for use as a new (or replacement) partition cache entry 221. In another embodiment, the cache manager 164 uses the ending location history cache entry (updated within the history cache 167 in step 204) for use as a new (or replacement) partition cache entry 221.

Using the aforementioned processing techniques, embodiments of the invention can process data access requests 125 by beginning at a location within the data 135 that is substantially closer to the desired offset position 127 at which a data access operation 126 specified by the data access request 125 is to begin within the data 135. As a result, the seek time to advance (beginning at the location defined in the closest cache entry) within the data 135 to the actual starting location for performance of the data access operation is significantly decreased as opposed to having to seek from the beginning of the data 135, as is done in conventional data access systems that attempt to provide access to non-open systems data on behalf of open systems data access requests.

Figure 6:
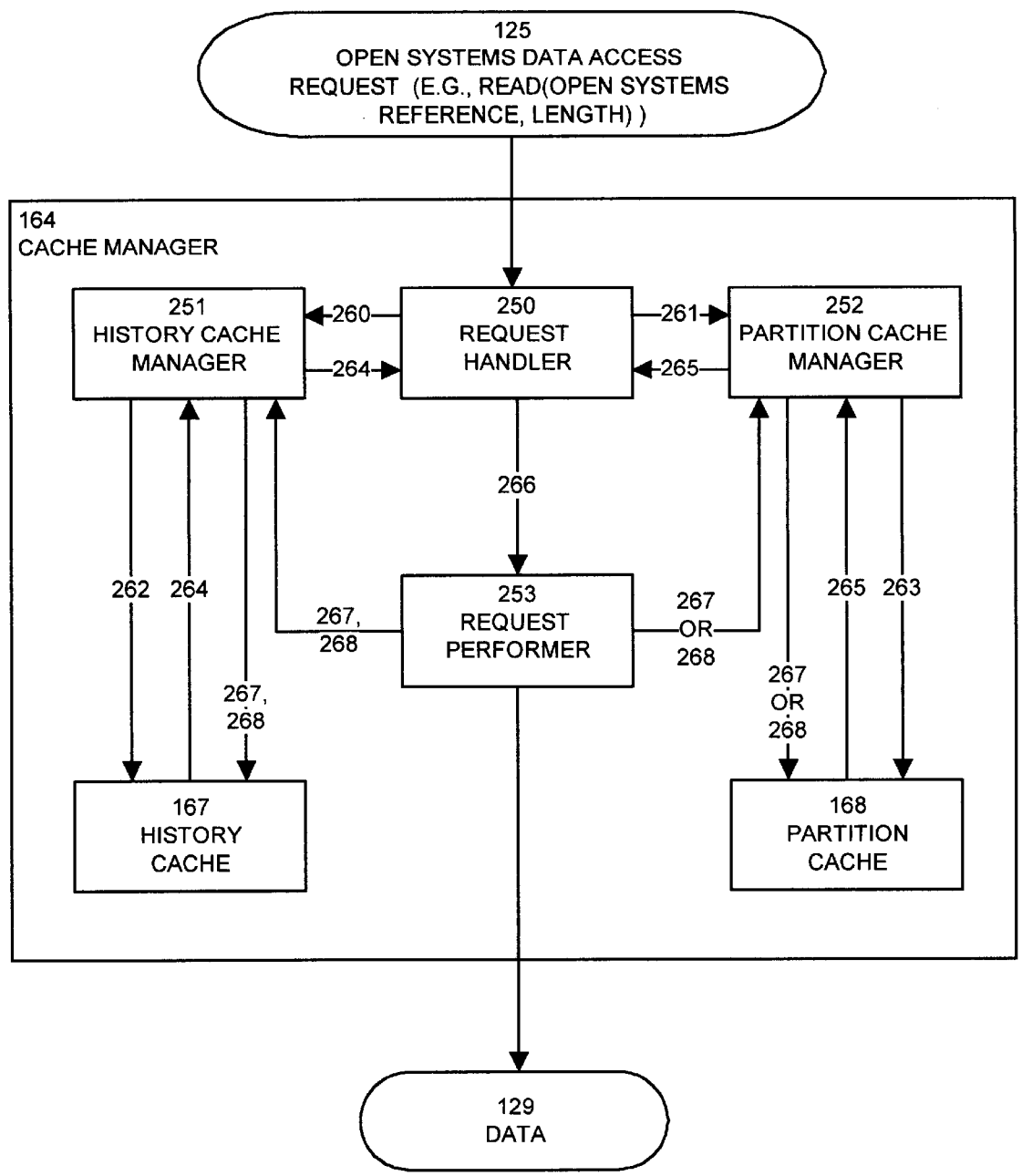
FIG. 6 illustrates an example architecture and data flow operation of a cache manager configured according to one embodiment of the invention.

FIG. 6 illustrates an example architecture and data flow operation of a cache manager 164 (and the architecture of the cache manager software application 163) configured according to one embodiment of the invention.

The cache manager 164 includes a request handler 250 which accepts or otherwise receives the open systems data access requests 125. Also included are a history cache manager 251 for management of the history cache 167 and a partition cache manager 252 for management of the partition cache 168. In addition to these components, the cache manager 164 includes a request performer 253 which operates to carry out the data access operations 126 specified within the data access requests 125. Starting and ending location results 267, 268, produced from performance of a data access operation 126, are returned to the history cache manager 251 and the partition cache manager 252 for creation of new cache entries 220, 221 as will be explained. Also as a result of performing the data access operation 126, the request performer 253 produces or outputs data 129 which the server computer system 110 (FIG. 1) returns to the requesting open systems client computer system 120.

Figure 7:
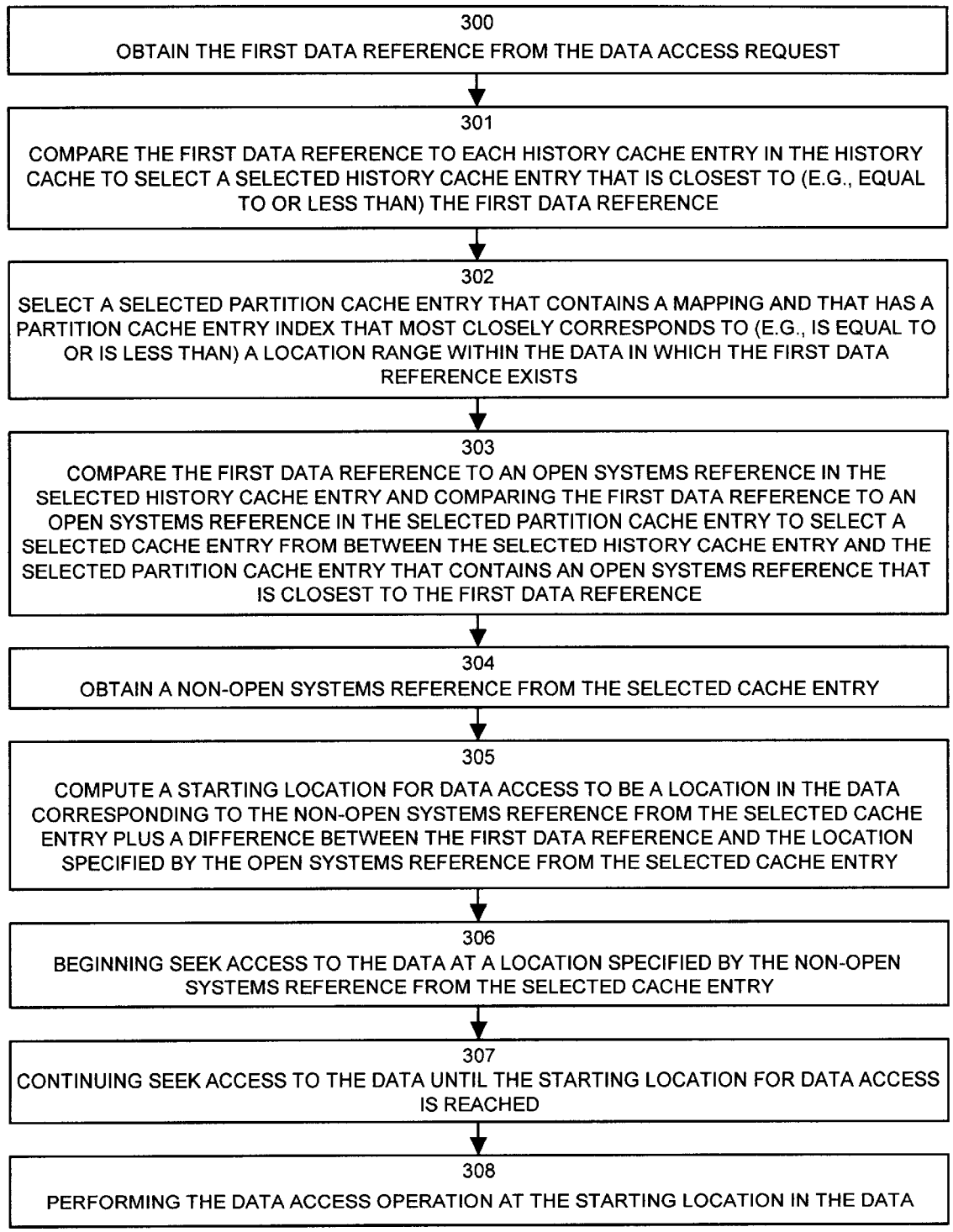
FIG. 7 is a flow chart of processing steps performed by a cache manager to obtain and use history and partition cache entries for the performance of a data access operation in accordance with one embodiment of the invention.

FIG. 7 is a flow chart of processing steps as performed by the various components of the cache manager 164 illustrated in FIG. 6 in accordance with one embodiment of the invention. Generally, the processing steps shown in FIG. 7 are directed to obtaining the history and partition cache entries 220, 221 and to using those entries for performance of a particular data access operation 126. During the discussion of the processing steps in FIG. 7, reference will be made to the components 250 through 253 and numbered data flows 260 through 268 (arrowed the lines containing numbers) shown in FIG. 6.

In step 300, the request handler 250 within the cache manager 164 obtains the first data reference 127 from the data access requests 125. As noted above, in a preferred embodiment of the invention, the first data reference 127 specifies an open systems offset or position within the data 135 at which the data access operation 126 is to be performed.

Next, in step 301, the request handler 250 directs 260 the history cache manager 251 to compare 262 the first data reference 127 to each existing (i.e., non-empty) history cache entry 220 (i.e., to the open systems reference 222 in each history cache entry 220) in the history cache 167 to select a selected history cache entry 220 that is closest to (e.g., equal to or less than) the first data reference 127. The history cache manager 251 returns 264 the selected history cache entry 220 to the request handler 250.

In step 302, the request handler 250 directs 261 the partition cache manager 252 to select 263 a selected partition cache entry 221 that contains a location pair mapping (i.e., a non-empty entry 221 containing location data 222, 224) and that has a partition cache entry index 228 that most closely corresponds to (e.g., is equal to or less than) a location range 225 within the data 135 in which the first data reference 127 exists. In other words, in step 302, the partition cache manager 252 retrieves an open systems reference 222 and a non-open systems reference 224 from a partition cache entry 221 according to a particular partition cache entry index 228 that has an associated location range 225 that is inclusive of the value of the offset in the first data reference 127.

In a preferred embodiment of the invention, if this particular partition cache entry 221 happens to be empty (indicating that no former data access operation has been performed on data within the location range 225 corresponding to this partition cache entry 221), then the partition cache manager 252 proceeds, in step 302, to access the first non-empty partition cache entry 221 that precedes the partition cache entry that was determined to be empty. In this manner, the partition cache manager 252 obtains the closest non-empty partition cache entry 221 to the desired first data reference 127. The partition cache manager 252 returns 265 the selected partition cache entry 210 to the request handler 250.

Next, in step 303, the request handler 250 compares the first data reference 127 to an open systems reference 222 in the selected history cache entry 220 and also compares the first data reference 127 to an open systems reference 222 in a selected partition cache entry 221 in order to select a selected cache entry, from between the selected history cache entry 220 and the selected partition cache entry 221, that contains an open systems reference 222 that is closest to the first data reference 127. In other words, the request handler 250 chooses which cache entry, the history cache entry 220 or the partition cache entry 221, is closest to (without exceeding) the first data reference 127.

Next, in step 304, the request handler 250 obtains the non-open systems reference value 224 from the selected cache entry (the cache entry 220 or 221 that was determined to be closest to the first data reference 127).

Next, in step 305, the request handler 250 computes a starting location for data access to be a location in the data 135 corresponding to the non-open systems reference 224 from the selected cache entry 220, 221 plus a difference between the first data reference 127 and the location specified by the open systems reference 222 from the selected cache entry 220, 221. Stated differently, in step 305, the request handler 250 uses the non-open systems reference 224 from a selected cache entry as a location in the data 135 that exists prior to or resides in the data before the actual required starting location for performance of the data access operation 126. However, since the request handler 250 is aware of the actual open systems offset starting location as specified by the first data reference 127, the difference between the first data reference 127 (i.e., the actual open systems starting location) and the open systems reference value 222 in a selected cache entry provides a byte count increment, or number of bytes which must be "advanced to" or "seeked to," beginning from the location defined by the non-open systems reference 224 within the selected cache entry, in order to arrive at the actual desired starting location for performance of the data access operation. Upon computing the proper starting location for data access, the request handler 250 provides this information 266 to the request performer 253.

In step 306, the request performer 253 begins seek access to (i.e., in) the data 135 at a location specified by the non-open systems reference 222 from the selected cache entry 220, 221.

Next, in step 307, the request performer 253 continues seek access in the data 135 until the starting location (computed in step 305) for data access is reached in the data 135. At this point, a data access mechanism, such as a pointer or other data set or file location identifier indicating the current data access position (e.g., current seek position) within the data 135 is now located at the proper starting location in order to begin performance of the data access operation 126 as specified within the open systems data rate access request 125.

In step 308, the request performer 253 performs the data access operation 126 at the starting location in the data. In this manner, the operation of the processing steps shown in FIG. 7 allow a cache manager 164 to retrieve the best possible cache entry as selected from either the history cache 167 or the partition cache 168. Then, based on the open systems and non-open system location information within the closest cache entry, the cache manager 164 can begin seeking to the proper starting location for performance of the data access operation 126 at a relatively close starting location within the data 135 without having to seek for the beginning of the data 135, as is done in conventional systems.

As noted above, upon completion of the data access operation in step 308, the request performer 253 is aware of at least one new mapping or location pair 222, 224 that defines the association of the open systems starting location for the beginning of the data access operation in conjunction with the non-open systems starting location or reference for the beginning of the data access operation. In addition, upon completion of the data access operation, the request performer 253 is also aware of a second new mapping or location pair 222, 224 that defines an association of the open systems ending location for the end of the data access operation in conjunction with the non-open systems ending location. This information is used in the processing explained with respect to FIG. 8 in order to create new history cache and partition cache entries 220 and 221.

Figure 8:
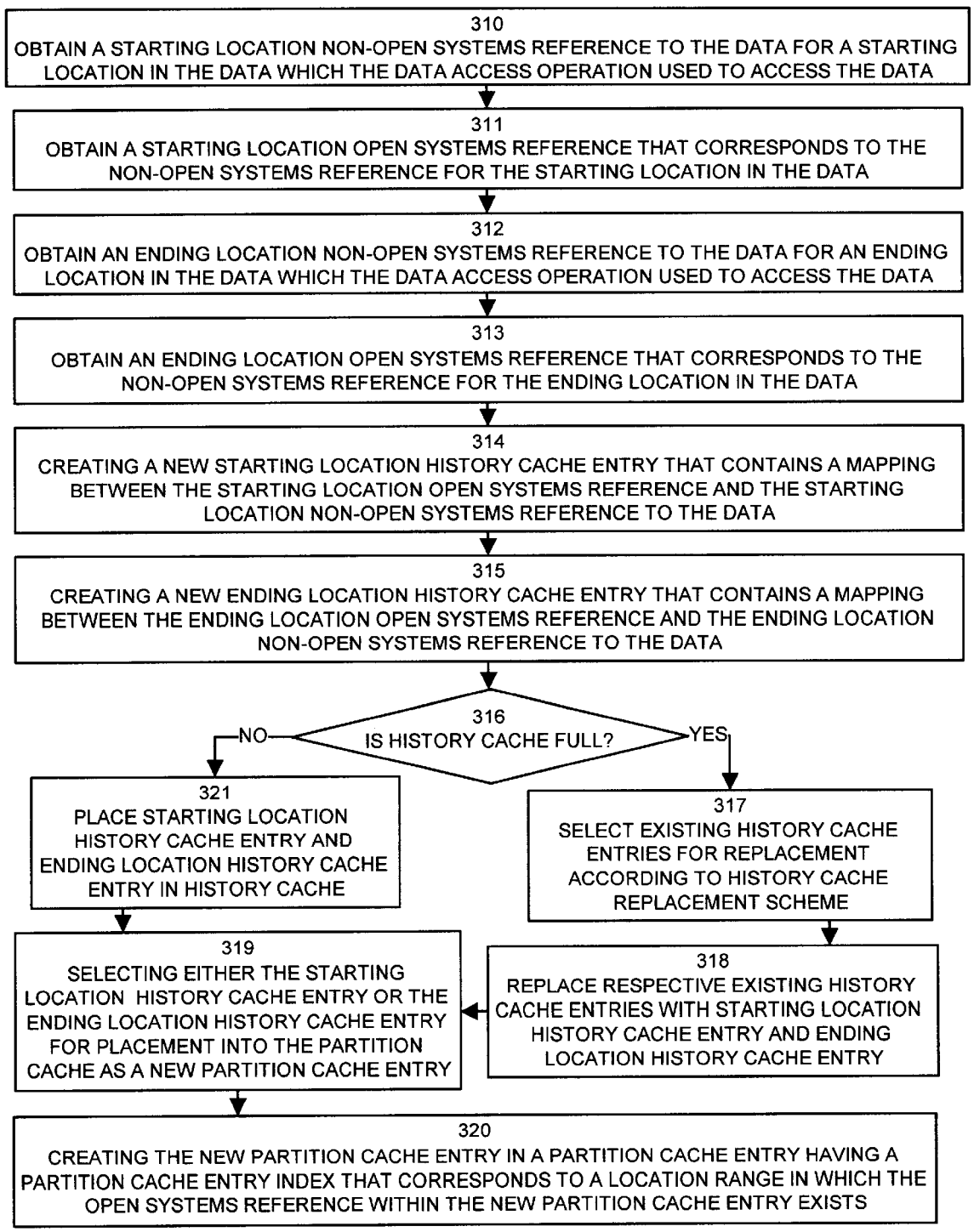
FIG. 8 is a flow chart of processing steps performed by the cache manager to update the history cache and partition cache with new cache entry(s) in accordance with one embodiment of the invention.

FIG. 8 is a flow chart of processing steps performed by a cache manager 164 in order to create new history and partition cache entries 220 and 221 according to one embodiment of the invention.

In step 310, the history cache manager 251 obtains the starting location non-open systems reference to the data 135 for a starting location in the data 135 which the data access operation 126 (as performed in step 308 of FIG. 7) used to access to data 135.

In step 311, the history cache manager 251 obtains a starting location open systems reference that corresponds to the non-open systems reference (obtained in step 310) for the starting location in the data 135.

In step 312, the history cache manager 251 obtains the ending location non-open systems reference to the data 135 for a ending location in the data 135 which the data access operation 126 (as performed in step 308 of FIG. 7) used to access to data 135.

In step 313, the history cache manager 251 obtains a ending location open systems reference that corresponds to the non-open systems reference (obtained in step 312) for the ending location in the data 135.

Next, in step 314, the history cache manager 251 creates a new starting location history cache entry 220 that contains a mapping between the starting location open systems reference 222 (obtained in step 311) and the starting location non-open systems reference 224 (obtained in step 310) for the data 135.

Likewise, in step 315, the history cache manager 251 creates a new ending location history cache entry 220 that contains a mapping between the ending location open systems reference 222 (obtained in step 313) and the ending location non-open systems reference 224 (obtained in step 312) for the data 135. At this point in processing, two new history cache entries 220 have been created for placement into the history cache 167.

Next, in step 316, the history cache manager 251 determines if the history cache 167 is full. In other words, in step 316, the history cache manager 251 determines if there are still two empty history cache entries 220 that do not contain mapping data for a mapping between open systems and non-open systems reference locations. If the history cache is not yet full, processing proceeds the step 321.

In step 321, the history cache manager 251 places the starting location history cache entry and the ending location history cache entry (both created as a result of the processing steps 310 through 315) into the history cache 167 at the next available (i.e., empty) history cache entry locations. Thereafter, processing proceeds step 319 as explained below.

Returning attention now the step 316, assume for this example that the history cache 167 is full. In other words, assume there are no empty history cache entries 220. If the history cache is full, processing proceeds from step 316 to step 317.

In step 317, the history cache manager 251 selects an existing set of two history cache entries for replacement according to a history cache replacements game. In other words, since in step 310 through 315, the history cache manager creates to new history cache entries 220, and the history cache 167 already contains a complete set (e.g., 100) of history cache entries, two existing entries 220 within the history cache 167 must be selected for replacement with the newly created cache entries.

According to one embodiment of the invention, a random history cache replacements scheme can be used such that the history cache manager 251 randomly selects any two history cache entries 220 for removal from the history cache 167. Alternatively, another embodiment of the invention can use a least recently used replacement algorithm in order to select history cache entries 220 for replacement that have not been access for the longest period of time. In yet another alternative embodiment of the invention, the history cache manager 251 can use a first in first-out history cache replacements scheme which cycles through the history cache entries 220. In any event, after processing step 317, the history cache manager 251 will have selected two history cache entries 220 for replacement in the history cache 167 and processing proceeds the step 318.

In step 318, the history cache manager 251 replaces 267, 268 (FIG. 6) the respective existing history cache entries (selected for replacement in step 317) with the starting and ending location history cache entries created as a result of the processing of step 310 through 315. In this manner, performance of each data access operation 126 causes two new history cache entries 220 to be created within the history cache 167. After processing step 318, processing proceeds the step 319.

In step 319, the partition cache manager 252, which also has access to the two new starting and ending history cache entries 220, selects either the starting location history cache entry or the ending location history cache entry (i.e., selects one of the new history cache entries 220) for placement into the partition cache 168 as a new partition cache entry 221. In one embodiment of the invention, the processing step 319 causes the partition cache manager 252 to select the starting location history cache entry for placement into the partition cache 168. In another embodiment of the invention, the processing step 319 causes the partition cache manager 252 to select the ending location history cache entry for placement into the partition cache 168. After the partition cache manager 252 determines which new history cache entry will be included as a new partition cache entry 221, processing proceeds step 320.

In step 320, the partition cache manager 252 creates a new partition cache entry 221 at a location within the partition cache 168 having a partition cache entry index 228 that corresponds to a location range 225 in which the open systems reference 222 within the new partition cache entry 221 exists. In other words, the new partition cache entry 221 is placed into the proper location within the partition cache 168 based upon the open systems reference 222 for that new entry which falls within one of the location ranges 225 assigned to a particular partition cache entry 221 as identified by a particular partition cache entry index 228.

Using the aforementioned techniques shown in FIG. 8, embodiments of the invention are able to update the history and partition caches 167, 168 in response to the performance of data access requests which provide new mappings between open systems and corresponding non-open systems locations within the data 135.

As previously noted, one embodiment of the invention makes an initial assumption that the size of the data set 135 is two gigabytes. It may be the case, in certain instances, that this assumption is incorrect and that the data 135 is larger than two gigabytes in length. In such instances, as discussed with respect to step 207 in FIG. 5, the cache manager 164 configured according to embodiments of the invention must manipulate the partition cache 168 in order to accommodate creation of a new partition cache entry 221.

Figure 9:
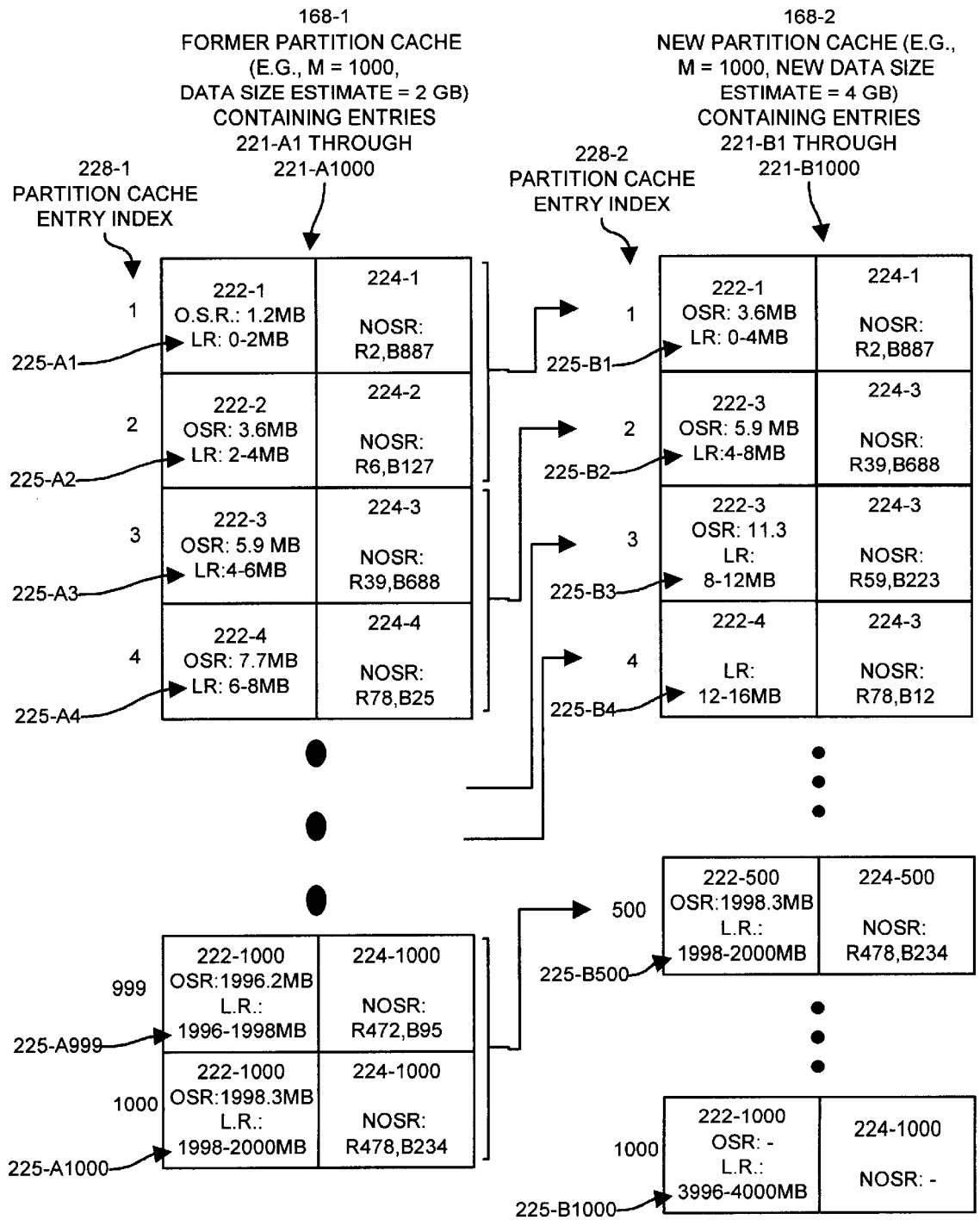
FIG. 9 shows an illustration of how a cache manager can condense a partition cache in accordance with one embodiment of the invention.

FIG. 9 illustrates an example of manipulating an existing or former partition cache 168-1 into a new partition cache 168-2 in which each new partition cache entry 221-B (i.e., each location pair 222, 224) in the new partition cache 168-2 represents a location range 225-B that is twice the size of the respective location range 225-A of the former partition cache entries 221-A. In this particular embodiment, the new partition cache 168-2 contains the same number of partition cache entries 221-B (1000 entries in this particular example) as did the former partition cache 168-1. However, each partition cache entry 221-B can now accommodate a mapping between an open systems reference 222 and a non-open systems reference 224 that resides within the new larger location range 225-B that is twice is large as the former location range 225-A assigned to each partition cache entry 221-A in the former partition cache 168-1.

As a specific example, the location range 225-B1 for the first new partition cache entry 221-B1 (not specifically labeled as such) having a partition cache entry index 228-2 that is equal to a value of one (1) now contains an associated location range ranging from zero (0) to four (4) megabytes. As such, the first partition cache entry 221-B1 in the new partition cache 168-2 can accommodate a mapping for an open systems reference 222 that can occur in an addressable data space that is twice the size of the location range 225-A1, which only spans the range from zero (0) to two (2) megabytes.

To achieve the new assignment of the new location ranges 225-B for the partition cache entries 221-B in the new partition cache 168-2, one embodiment of the invention can double the estimated size of the data 135 from two gigabytes up to four gigabytes. As a result of this doubling operation, the location ranges 225-A can be re-computed by dividing the assumed new and larger size of the data, which is now four gigabytes, by the number of partition entries in the partition cache 168, which is still one thousand. The result of this example is that each partition cache entry now has a location range 225-B that spans four megabytes of the data 135.

When the cache manager 164 reassigns new location ranges 225-B to a partition cache 168-2, the former existing entries 221-A in the former partition cache 221-A are still worth saving for use as partition cache entries. In other words, these entries 221-A are still valid references to locations in the data 135. To this end, the cache manager 164 copies as many existing partition cache entries 221 from the former partition cache 168-1 to the new partition cache 168-2.

However, as illustrated in FIG. 9, when an existing partition map 168-1 is copied (e.g., condensed) into a new partition cache 168-2, there can exist two (or more if the assumed size of the data is more than doubled from its previous assumed size) partition cache entries 220-A from the former partition cache 168-1 that each could be copied into a single new partition cache entry 221-B. This is the case because, as illustrated in this example, the location ranges 225-A of the former partition cache entries 221-A are one-half of the size of the location ranges 225-B for the new partition cache 168-2. As a result, if two or more former partition cache entries 220-A each fall within a location range 225-B for mapping or copying (i.e., placement) into the new partition cache 168-2, the cache manager 164 must make a choice as to which former partition cache entry 221-A is to be placed into the single new partition cache entry 221-B containing the modified (increased, in this example) location range 225-B. One embodiment of the invention (the embodiment illustrated in FIG. 9) selects the former or pre-existing partition cache entry 221-A having the highest or greatest value for the open systems reference 222. Another embodiment of the invention selects the former or pre-existing partition cache entry 221-A having the lowest value for the open systems reference 222.

As shown in the example in FIG. 9, if the former partition cache 168-1 contains mapping information in each partition cache entry 221-A, and this former partition cache 168-1 is condensed or copied into the new partition cache 168-2 which assumes the data 135 is four (4) gigabytes and size, then the resulting new partition cache 168-2 will have copies of formerly existing partition cache entry 221-A in only the first five hundred new partition cache entries 221-B1 through 221-B500. The second half of the new partition cache 168-2 will remain empty until data access operations are subsequently performed which cause partition cache entries 221-B to be created for mappings which occur in the location ranges assigned to these "high location range" partition cache entries 221B-501 through 221-B502.

Figure 10:
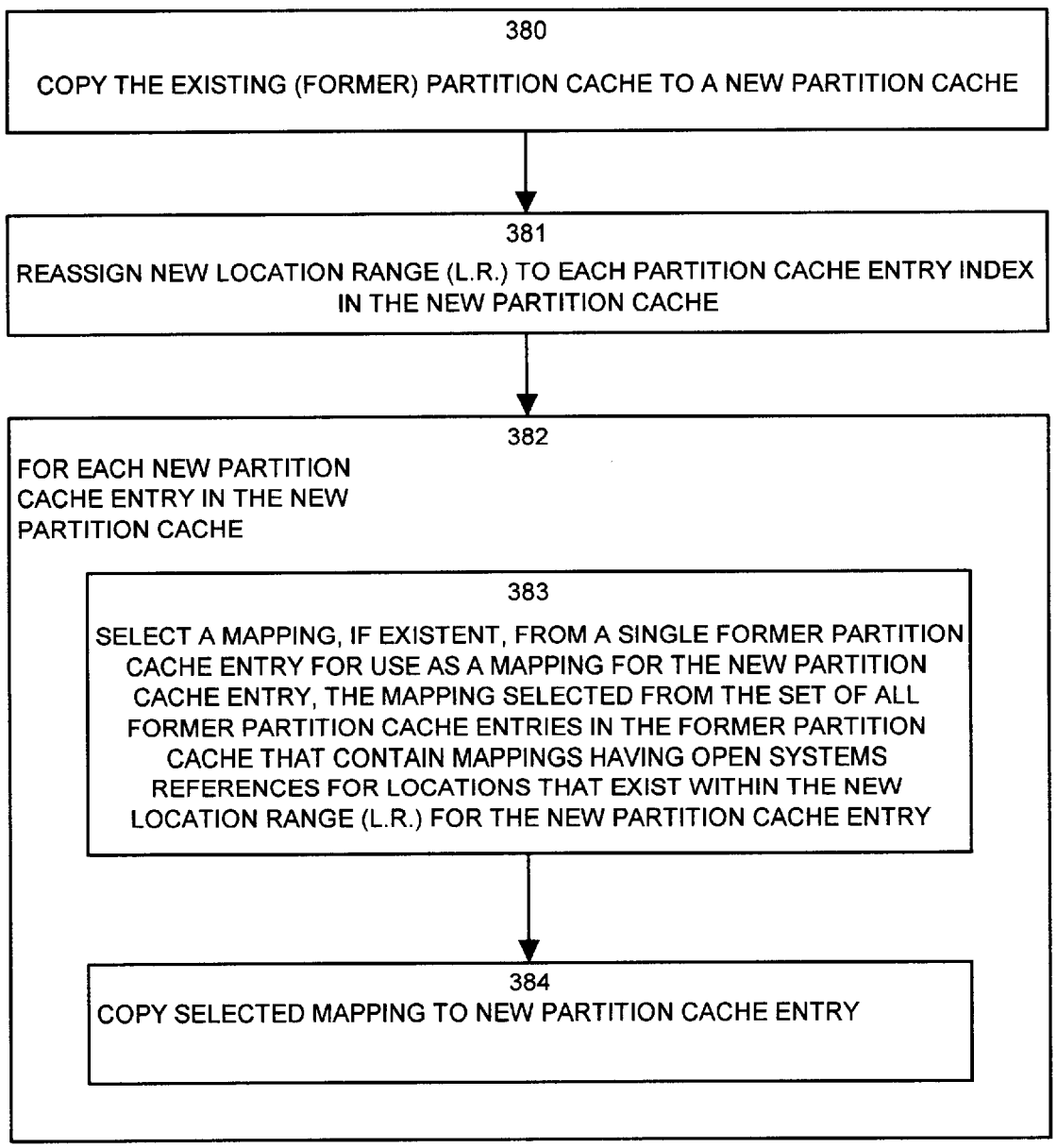
FIG. 10 is a flow chart of processing steps performed by a cache manager to manipulate a partition cache in order to be able to accept a new partition cache entry in accordance with one embodiment of the invention.

FIG. 10 shows a flow chart of processing steps performed to manipulate an existing partition cache 168-1 to accommodate creation of new partition cache entries (as explained above with respect to step 207 in FIG. 5) in a new partition cache 168-2.

In step 380, the cache manager 164 copies the existing or former partition cache 168-1 to a new partition cache 168-2.

In step 381, the cache manager 164 reassigns new location ranges 225-B to each partition cache entry index 228-2 in the new partition cache 168-2.

Next, in step 382, the cache manager 164 enters a loop which takes place for each new partition cache entry 221-B in the new partition cache 168-2.

Within this loop (step 382), in step 383, the cache manager 164 selects a mapping, if existent, from a single former partition cache entry 221-A for use as a mapping for the new partition cache entry 221-B being processed in this generation of the loop in step 382). The mapping (i.e., in the former entry 221-A) is selected from the set of all former partition cache entries 221-A in the former partition cache 168-1 that contain mappings having open systems references 222 for locations or offsets that exist within the new location range 225-B for the new partition cache entry 221-B.

Thereafter, in step 384, the cache manager 164 copies the selected mapping from the former partition cache 168-1 to the new partition cache entry 221-B within the new partition cache 168-2.

In this manner, the system of the invention can scale the size of the partition cache 168 to accommodate data sets 135 of any size. It is to be understood that embodiments of the invention which assumes an initial size of the data 135 to be two gigabytes are provided as example embodiments only. That is, the initial size estimate of two gigabytes for the data 135 may change and be greater or smaller in alternative embodiments of the invention.

Various alternative embodiments of the invention exists as well to those described in detail above. For example, as data access operations are performed over time and various cache entry mappings are obtained as a result (as explained herein), the history cache and the partition cache begin to fill up with mappings. The history cache may fill up quickly. However, the partition cache may fill up more slowly as new ranges (i.e., new addresses) of the data are successively accessed as a result of performing more and more data access operations into new areas or locations of the data. Each time a new data access operation is performed on a new area (i.e., a new address range) of the data, a new set of cache entries can be created, and one (or possibly more) of these can be entered into the partition cache at the appropriate partition cache entry location (i.e., index). For each data access operation, a partition cache will typically receive one new entry (or may have an existing entry replaced by a more recent data access location mapping). However, if, for example, starting and ending location mappings cross from one location range for one partition cache entry to the next or a later location ranges for another partition cache entry (i.e., the starting location cache entry falls in one location range, while the ending location falls within another location range, such as the range for the next higher indexed partition cache entry), then the partition cache entry can receive two new cache entries, one for each different location range.

In another alternative embodiment, the cache manager 164 can receive a data access request that can cause the cache manager 164 to pre-fill the partition cache 168 with partition cache entries 221 by beginning a seek operation at the beginning of the data 135 (i.e., at location 0) and seeking until the end of the data 135 is reached. During such a seek operation, as the cache manager 164 seeks to new locations (e.g., byte by byte) that exist within each new location range 225 corresponding to successive partition cache entries 221, the cache manager can briefly pause the seek operation in order to create a partition cache entry 221 for that respective location range. In this manner, while seeking from the beginning of the data 135 to the end of the data 135, each partition entry will be populated with a location pair 222, 224 that falls within its respective location range of addresses within the data 135. As such, upon completion, all partition cache entries will contain a valid location pair 222, 224 for the data 135. Thereafter, as subsequent data access operations are received, the cache manager 164 can use the pre-populated partition cache 168 as a source of location information.

An embodiment operating according to this aspect of the invention uses a partition cache to access data by performing a data access operation continuously from a beginning of the data to an end of the data. During performance of the data access operation, the embodiment detects when a location in the data is accessed that corresponds to a new location range associated with a partition entry in the partition cache, and upon such detection, creates a partition cache entry in the partition cache. This guarantees that no seek operation will ever have to be done in step 306 (FIG. 7) for more that than the length of data 135 determined by the size of the location range for the partition cache 168.

Those skilled in the art will understand that there can be many variations made, for example, to the data access server functions explained above while still achieving the same objective of those functions and the invention in general. Such variations are intended to be covered by the scope of this invention. As such, the foregoing description of embodiments of the invention are not intended to be limiting. Rather, any limitations to the invention are presented in the following claims.

What is claimed is:

1. A method for providing access to data, the method comprising the steps of:

receiving a data access request containing a first data reference;

obtaining a history cache entry from a history cache based on the first data reference;

obtaining a partition cache entry from a partition cache based on the first data reference;

performing a data access operation on the data as specified in the data access request using a second data reference obtained from one of the history cache entry and the partition cache entry;

the history cache including a plurality of history cache entries, each history cache entry containing a mapping between an open systems reference to a location in the data and a non-open systems reference to a location in the data, and each history cache entry being obtained from a former data access operation to the data; and wherein the step of obtaining a history cache entry includes the step of comparing the first data reference to each history cache entry in the history cache to select a selected history cache entry that is closest to the first data reference.

2. The method of claim 1 wherein:

the data is stored in a non-open systems format;

the data access request is an open systems request to access the data stored in a non-open systems format;

the first data reference contains an offset location to an open-systems location in the data to be accessed by the open systems request;

the second data reference identifies a non-open system location in the data that corresponds closest to the first data reference; and the history cache entry and the partition cache entry each contain a mapping between an open systems reference to a location in the data and a non-open systems reference to a location in the data.

3. The method of claim 1 wherein:

the data access request is a read request received from an open systems computer system to read the data which is non-open systems data at an open systems location specified by the first data reference;

the history cache and partition cache contain respective history cache entries and partition cache entries that contain mappings of open systems data locations in the data to non-open systems data locations in the data; and wherein the step of performing uses a non-open systems data location in the data, as obtained from at least one of the history cache entry and the partition cache entry, as a starting point in the data that is substantially close to a starting location in the data at which the data access operation is to be performed in order to advance to the starting location in the data at which the data access operation is to be performed.

4. The method of claim 1 wherein the step of obtaining selects the selected history cache entry from the plurality of history cache entries that contains an open systems reference that is closest to the first data reference and that is at least one of:

i) equal to; and ii) less than the first data reference.

5. The method of claim 1 wherein:

the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data, such that if a partition cache entry contains a mapping between an open systems reference to a location in the data and a non-open systems reference to a location in the data, the open systems reference in that partition cache entry corresponds to a location in the data that exists within the location range corresponding to that partition cache entry index; and wherein the step of obtaining a partition cache entry includes the step of selecting a selected partition cache entry that contains a mapping and that has a partition cache entry index that most closely corresponds to a location range within the data in which an open systems reference to a location in the data identified in the first data reference exists.

6. The method of claim 5 wherein the step of obtaining selects the selected partition cache entry from the plurality of partition cache entries that contains an open systems reference that is closest to the first data reference and that is at least one of:

i) equal to; and ii) less than the first data reference.

7. The method of claim 1 further including the steps of:

in response to performing the data access operation, updating at least one history cache entry in the history cache with at least one new history cache entry.

8. The method of claim 7 wherein:

the history cache can contain a plurality of history cache entries, and each history cache entry can contain a mapping between an open systems reference to a location in the data and a non-open systems reference to a location in the data;

wherein the steps of the method for providing access to data are repeated such that the history cache is filled with history cache entries created in response to the performance of successive data access operations; and wherein when the history cache is filled with history cache entries, new history cache entries that are created as a result of further performance of successive data access operations replace existing history cache entries.

9. The method of claim 7 wherein the step of updating at least one history cache entry in the history cache with at least one new history cache entry includes the step of:

replacing at least one existing history cache entry with a respective at least one new history cache entry.

10. The method of claim 9 wherein the step of replacing includes the step of:

selecting the at least one existing history cache entry for replacement according to a history cache replacement scheme including at least one of: a random replacement scheme, a least recently used replacement scheme, and a first in first out replacement scheme.

11. The method of claim 1 further comprising the steps of:

in response to performing the data access operation, updating the partition cache with at least one new partition cache entry.

12. The method of claim 11 wherein the step of updating the partition cache includes:

obtaining a non-open systems reference to the data which the step of performing uses to perform the data access operation on the data;

obtaining an one open systems reference to the data which the step of performing uses to perform the data access operation on the data; and creating a new partition cache entry, the new partition cache entry containing a mapping between the one open systems reference to the data and the non-open systems reference to the data.

13. The method of claim 12 wherein:

the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data, such that if a partition cache entry contains a mapping between an open systems reference to a location in the data and a non-open systems reference to a location in the data, the open systems reference in that partition cache entry corresponds to a location in the data that exists within the location range corresponding to that partition cache entry index; and wherein the step of creating a new partition cache entry includes the step of creating the new partition cache entry in a partition cache entry having a partition cache entry index that corresponds to a location range within the data in which an open systems reference to a location in the data as identified in the new partition cache entry exists.

14. A method for providing access to data, the method comprising the steps of:

receiving a data access request containing a first data reference;

obtaining a history cache entry from a history cache based on the first data reference;

obtaining a partition cache entry from a partition cache based on the first data reference;

performing a data access operation on the data as specified in the data access request using a second data reference obtained from one of the history cache entry and the partition cache entry;

comparing the first data reference to an open systems reference in the history cache entry and comparing the first data reference to an open systems reference in the partition cache entry to select a selected cache entry from between the history cache entry and the partition cache entry that contains an open systems reference that is the closest to the first data reference; and obtaining, for use as the second data reference for performance of the data access operation, a non-open systems reference from the selected cache entry that contains the open systems reference that is the closest to the first data reference.

15. The method of claim 14 wherein:

the first data reference corresponds to an open systems starting location in the data at which the data access operation is to be performed;

wherein the open systems reference in each of the history cache entry and the partition cache entry correspond to open systems locations in the data obtained from formerly performed data access operations; and wherein the step of comparing selects the selected cache entry from between the history cache entry and the partition cache entry that contains an open systems reference that is closest to the first data reference and that is at least one of:

i) equal to; and ii) less than the first data reference.

16. The method of claim 15 wherein the open systems reference of the selected cache entry corresponds to a location in the data that is at least one of:

i) the same as; and ii) before the open systems starting location in the data corresponding to the first data reference at which the data access operation is to be performed.

17. The method of claim 14 wherein the step of performing a data access operation includes the steps of:

computing a starting location for data access based upon:

i) the first data reference from the data access request;

ii) the open systems reference from the selected cache entry; and iii) the non-open systems reference from the selected cache entry;

providing access to the starting location in the data; and performing the data access operation at the starting location in the data.

18. The method of claim 17 wherein the step of computing a starting location for data access comprises the step of:

computing the starting location for data access to be a location in the data corresponding to the non-open systems reference from the selected cache entry plus a difference between the first data reference and the location specified by the open systems reference from the selected cache entry.

19. The method of claim 17 wherein the step of providing access to the starting location in the data comprises the steps of:

beginning seek access to the data at a location specified by the non-open systems reference; and continuing seek access to the data until the starting location for data access is reached.

20. A method for providing access to data, the method comprising the steps of:

receiving a data access request containing a first data reference;

obtaining a history cache entry from a history cache based on the first data reference;

obtaining a partition cache entry from a partition cache based on the first data reference;

performing a data access operation on the data as specified in the data access request using a second data reference obtained from one of the history cache entry and the partition cache entry;

in response to performing the data access operation, updating at least one history cache entry in the history cache with at least one new history cache entry;

obtaining a non-open systems reference to the data which the step of performing uses to perform the data access operation on the data;

obtaining an open systems reference to the data which the step of performing uses to perform the data access operation on the data; and creating a new history cache entry, the new history cache entry containing a mapping between the one open systems reference to the data and the non-open systems reference to the data.

21. The method of claim 20 further including the step of:
creating a new partition cache entry using the history cache entry.

22. The method of claim 20 wherein the steps of obtaining a non-open systems reference to data, obtaining an open systems reference to the data, and creating a new history cache entry are performed for starting locations in the data, such that the new history cache entry is a starting location history cache entry that contains a mapping between an open systems reference and a corresponding non-open systems reference that reflect a starting location for the data access operation in the data.

23. The method of claim 22 wherein the steps of obtaining a non-open systems reference to data, obtaining an one open systems reference to the data, and creating a new history cache entry are repeated for ending locations in the data to create a second new history cache entry, such that the second new history cache entry is an ending location history cache entry that contains a mapping between an open systems reference and a corresponding non-open systems reference that reflect an ending location for the data access operation in the data.

24. The method of claim 22 further including the step of:
updating a partition cache entry in the partition cache using the starting location history cache entry.

25. The method of claim 20 wherein the steps of obtaining a non-open systems reference to data, obtaining an one open systems reference to the data, and creating a new history cache entry are performed for ending locations in the data, such that the new history cache entry is an ending location history cache entry that contains a mapping between an open systems reference and a corresponding non-open systems reference that reflect an ending location for the data access operation in the data.

26. A method for providing access to data, the method comprising the steps of:
receiving a data access request containing a first data reference;

obtaining a history cache entry from a history cache based on the first data reference;

obtaining a partition cache entry from a partition cache based on the first data reference;

performing a data access operation on the data as specified in the data access request using a second data reference obtained from one of the history cache entry and the partition cache entry;

wherein the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data;

such that each successive partition cache entry represents a next successive location range for which that partition cache entry can contain a mapping of an open systems reference within that location range to a non-open systems reference in the data; and such that if a partition cache entry contains a mapping between an open systems reference to a location in the data and a non-open systems reference to a location in the data, the open systems reference in that partition cache entry corresponds to a location in the data that exists within the location range corresponding to that partition cache entry index.

27. The method of claim 26 wherein:
the data is assumed to be a predetermined size;
the plurality of partition cache entries comprise a predetermined number of successively ordered partition cache entries, each having a partition cache entry index having a value corresponding to a respective location in the predetermined number of successively ordered partition cache entries; and wherein the location range associated with each partition cache entry is set to a value corresponding to the value of the partition cache entry index multiplied by a location range increment, the location range increment being the predetermined size of the data divided by the predetermined number of partition cache entries.

28. The method of claim 26 further including the steps of:
manipulating the partition cache to accommodate creation of a partition cache entry based on the data access request if the data access request includes a first data reference that references an open systems location in the data that is beyond the location range corresponding to the last partition cache entry index.

29. The method of claim 28 wherein the partition cache is a former partition cache and the step of manipulating the partition cache includes the step of:
condensing the partition cache by:
i) copying the former partition cache to a new partition cache containing new partition cache entries;
ii) re-assigning a new location range to each partition cache entry index in the new partition cache, the new location range for each partition cache entry index being substantially twice a size of the location range assigned a corresponding partition cache entry having the same partition cache entry index value in the former partition cache; and
ii) for each new partition cache entry in the new partition cache, selecting a mapping, if existent, from a single former partition cache entry for use as a mapping for the new partition cache entry, the mapping selected from a set of all former partition cache entries in the former partition cache that contain mappings having open systems references for locations that exist within the new location range for the new partition cache entry.

30. The method of claim 29 wherein the step of selecting a mapping, if existent, from a single former partition cache entry for use as a mapping for the new partition cache entry, selects a mapping having a highest location value for the open systems reference from the set of all former partition cache entries in the former partition cache that contain mappings having open systems references for locations that exist within the new location range for the new partition cache entry.

31. The method of claim 28 wherein the step of manipulating the partition cache to accommodate creation of a partition cache entry comprises the step of:
  adding successive additional partition cache entries onto the end of the partition cache and assigning a corresponding location range to each added partition cache entry until enough successive additional partition cache entries are added that contain corresponding location ranges in which the reference to an open systems location can exist.

32. A computerized device comprising:
  an interface;
  a memory system;
  a processor; and
  an interconnection mechanism connecting the interface, the processor and the memory system;
  wherein the memory system is encoded with a cache manager application that when performed on the processor, produces a cache manager process that provides access to data which is accessible to the computerized device, such that the computerized device operating the cache manager performs the operations of:
    receiving a data access request via the interface containing a first data reference;
    obtaining a history cache entry from a history cache in the memory system based on the first data reference;
    obtaining a partition cache entry from a partition cache in the memory system based on the first data reference;
    performing a data access operation on the data as specified in the data access request using a second data reference obtained from one of the history cache entry and the partition cache entry;
    the history cache can include a plurality of history cache entries, each history cache entry containing a mapping between an open systems reference to a location in the data and a non-open systems reference to a location in the data, and each history cache entry being obtained from a former data access operation to the data;
    and wherein the operation of obtaining a history cache entry includes the operation of comparing the first data reference to each history cache entry in the history cache to select a selected history cache entry that is closest to the first data reference.

33. The computerized device of claim 32 wherein:
  the data is stored in a non-open systems format;
  the data access request is an open systems request to access the data stored in a non-open systems format;
  the first data reference contains an offset location to an open-systems location in the data to be accessed by the open systems request;
  the second data reference identifies a non-open system location in the data that corresponds closest to the first data reference; and
  the history cache entry and the partition cache entry each contain a mapping between an open systems reference to a location in the data and a non-open systems reference to a location in the data.

34. The computerized device of claim 32 wherein:
  the data access request is a read request received over the interface from an open systems computer system to read the data which is non-open systems data at an open systems location specified by the first data reference;
  the history cache and partition cache contain respective history cache entries and partition cache entries that contain mappings of open systems data locations in the data to non-open systems data locations in the data; and
  wherein the operation of performing uses a non-open systems data location in the data, as obtained from at least one of the history cache entry and the partition cache entry, as a starting point in the data that is substantially close to a starting location in the data at which the data access operation is to be performed in order to advance to the starting location in the data at which the data access operation is to be performed.

35. The computerized device of claim 32 wherein the operation of obtaining selects the selected history cache entry from the plurality of history cache entries that contains an open systems reference that is closest to the first data reference and that is at least one of:
  i) equal to; and
  ii) less than the first data reference.

36. The computerized device of claim 32 wherein:
  the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data, such that if a partition cache entry contains a mapping between an open systems reference to a location in the data and a non-open systems reference to a location in the data, the open systems reference in that partition cache entry corresponds to a location in the data that exists within the location range corresponding to that partition cache entry index; and
  wherein the operation of obtaining a partition cache entry includes the operation of selecting a selected partition cache entry that contains a mapping and that has a partition cache entry index that most closely corresponds to a location range within the data in which an open systems reference to a location in the data identified in the first data reference exists.

37. The computerized device of claim 36 wherein the operation of obtaining selects the selected partition cache entry from the plurality of partition cache entries that contains an open systems reference that is closest to the first data reference and that is at least one of:
  i) equal to; and
  ii) less than the first data reference.

38. The computerized device of claim 32 further performing the operations of:
  in response to performing the data access operation, updating at least one history cache entry in the history cache with at least one new history cache entry.

39. The computerized device of claim 38 wherein:
  the history cache can contain a plurality of history cache entries, and each history cache entry can contain a mapping between an open systems reference to a location in the data and a non-open systems reference to a location in the data;
  wherein the operations of the method for providing access to data are repeated such that the history cache is filled with history cache entries created in response to the performance of successive data access operations; and
  wherein when the history cache is filled with history cache entries, new history cache entries that are created as a result of further performance of successive data access operations replace existing history cache entries.

40. The computerized device of claim 38 wherein when the computerized device performs the operation of updating at least one history cache entry in the history cache with at least one new history cache entry, the computerized device performs the operation of:

replacing at least one existing history cache entry with a respective at least one new history cache entry.

41. The computerized device of claim 40 wherein when the computerized device performs the operation of replacing, the computerized device performs the operation of:

selecting the at least one existing history cache entry for replacement according to a history cache replacement scheme including at least one of: a random replacement scheme, a least recently used replacement scheme, and a first in first out replacement scheme.

42. The computerized device of claim 32 wherein the computerized device further performs the operations of:

in response to performing the data access operation, updating the partition cache with at least one new partition cache entry.

43. The computerized device of claim 42 wherein when the computerized device performs the operation of updating the partition cache, the computerized device performs the operation of:

obtaining a non-open systems reference to the data which the operation of performing uses to perform the data access operation on the data;

obtaining an one open systems reference to the data which the operation of performing uses to perform the data access operation on the data; and creating a new partition cache entry, the new partition cache entry containing a mapping between the one open systems reference to the data and the non-open systems reference to the data.

44. The computerized device of claim 43 wherein:

the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data, such that if a partition cache entry contains a mapping between an open systems reference to a location in the data and a non-open systems reference to a location in the data, the open systems reference in that partition cache entry corresponds to a location in the data that exists within the location range corresponding to that partition cache entry index; and wherein the operation of creating a new partition cache entry includes the operation of creating the new partition cache entry in a partition cache entry having a partition cache entry index that corresponds to a location range within the data in which an open systems reference to a location in the data as identified in the new partition cache entry exists.

45. A computerized device comprising:

an interface;

a memory system;

a processor; and an interconnection mechanism connecting the interface, the processor and the memory system;

wherein the memory system is encoded with a cache manager application that when performed on the processor, produces a cache manager process that provides access to data which is accessible to the computerized device, such that the computerized device operating the cache manager performs the operations of:

receiving a data access request via the interface containing a first data reference;

obtaining a history cache entry from a history cache in the memory system based on the first data reference;

obtaining a partition cache entry from a partition cache in the memory system based on the first data reference;

performing a data access operation on the data as specified in the data access request using a second data reference obtained from one of the history cache entry and the partition cache entry; and wherein when the computerized device performs the operation of performing a data access operation, the computerized device further performs the operations of:

comparing the first data reference to an open systems reference in the history cache entry and comparing the first data reference to an open systems reference in the partition cache entry to select a selected cache entry from between the history cache entry and the partition cache entry that contains an open systems reference that is the closest to the first data reference; and obtaining, for use as the second data reference for performance of the data access operation, a non-open systems reference from the selected cache entry that contains the open systems reference that is the closest to the first data reference.

46. The computerized device of claim 45 wherein:

the first data reference corresponds to an open systems starting location in the data at which the data access operation is to be performed;

wherein the open systems reference in each of the history cache entry and the partition cache entry correspond to open systems locations in the data obtained from formerly performed data access operations; and wherein the operation of comparing selects the selected cache entry from between the history cache entry and the partition cache entry that contains an open systems reference that is closest to the first data reference and that is at least one of:

i) equal to; and ii) less than the first data reference.

47. The method of claim 46 wherein the open systems reference of the selected cache entry corresponds to a location in the data that is at least one of:

i) the same as; and ii) before the open systems starting location in the data corresponding to the first data reference at which the data access operation is to be performed.

48. The computerized device of claim 45 wherein when the computerized device causes performs the operation of performing a data access operation, the computerized device performs the operations of:

computing a starting location for data access based upon:

i) the first data reference from the data access request;

ii) the open systems reference from the selected cache entry; and iii) the non-open systems reference from the selected cache entry;

providing access to the starting location in the data; and performing the data access operation at the starting location in the data.

49. The computerized device of claim 48 wherein when the computerized device performs the operation of computing a starting location for data access, the computerized device performs the operation of:
    computing the starting location for data access to be a location in the data corresponding to the non-open systems reference from the selected cache entry plus a difference between the first data reference and the location specified by the open systems reference from the selected cache entry.

50. The computerized device of claim 48 wherein when the computerized device performs the operation of providing access to the starting location in the data, the computerized device performs the operations of:
    beginning seek access to the data at a location specified by the non-open systems reference; and
    continuing seek access to the data until the starting location for data access is reached.

51. A computerized device comprising:
    an interface;
    a memory system;
    a processor; and
    an interconnection mechanism connecting the interface, the processor and the memory system;
    wherein the memory system is encoded with a cache manager application that when performed on the processor, produces a cache manager process that provides access to data which is accessible to the computerized device, such that the computerized device operating the cache manager performs the operations of:
        receiving a data access request via the interface containing a first data reference;
        obtaining a history cache entry from a history cache in the memory system based on the first data reference;
        obtaining a partition cache entry from a partition cache in the memory system based on the first data reference;
        performing a data access operation on the data as specified in the data access request using a second data reference obtained from one of the history cache entry and the partition cache entry;
        in response to performing the data access operation, updating at least one history cache entry in the history cache with at least one new history cache entry;
        wherein when the computerized device performs the operation of updating the history cache, the computerized device performs the operations of:
            obtaining a non-open systems reference to the data which the operation of performing uses to perform the data access operation on the data;
            obtaining an open systems reference to the data which the operation of performing uses to perform the data access operation on the data; and
            creating a new history cache entry, the new history cache entry containing a mapping between the one open systems reference to the data and the non-open systems reference to the data.

52. The computerized device of claim 51 wherein the computerized device further performs the operation of:
    creating a new partition cache entry using the history cache entry.

53. The computerized device of claim 51 wherein the operations of obtaining a non-open systems reference to data, obtaining an open systems reference to the data, and creating a new history cache entry are performed by the computerized device for starting locations in the data, such that the new history cache entry is a starting location history cache entry that contains a mapping between an open systems reference and a corresponding non-open systems reference that reflect a starting location for the data access operation in the data.

54. The computerized device of claim 53 wherein the operations of obtaining a non-open systems reference to data, obtaining an one open systems reference to the data, and creating a new history cache entry are repeated by the computerized device for ending locations in the data to create a second new history cache entry, such that the second new history cache entry is an ending location history cache entry that contains a mapping between an open systems reference and a corresponding non-open systems reference that reflect an ending location for the data access operation in the data.

55. The computerized device of claim 53 wherein the computerized device further performs the operation of:
    updating a partition cache entry in the partition cache using the starting location history cache entry.

56. The computerized device of claim 51 wherein the operations of obtaining a non-open systems reference to data, obtaining an one open systems reference to the data, and creating a new history cache entry are performed by the computerized device for ending locations in the data, such that the new history cache entry is an ending location history cache entry that contains a mapping between an open systems reference and a corresponding non-open systems reference that reflect an ending location for the data access operation in the data.

57. A computerized device comprising:
    an interface;
    a memory system;
    a processor; and
    an interconnection mechanism connecting the interface, the processor and the memory system;
    wherein the memory system is encoded with a cache manager application that when performed on the processor, produces a cache manager process that provides access to data which is accessible to the computerized device, such that the computerized device operating the cache manager performs the operations of:
        receiving a data access request via the interface containing a first data reference;
        obtaining a history cache entry from a history cache in the memory system based on the first data reference;
        obtaining a partition cache entry from a partition cache in the memory system based on the first data reference;
        performing a data access operation on the data as specified in the data access request using a second data reference obtained from one of the history cache entry and the partition cache entry; and
        wherein the partition cache can include a plurality of partition cache entries, each partition cache entry capable of containing a mapping between an open systems reference to a location in the data and a non-open systems reference to a location in the data, and each partition cache entry has a respective partition cache entry index corresponding to a respective location range within the data;
        such that each successive partition cache entry represents a next successive location range for which that partition cache entry can contain a mapping of an open systems reference within that location range to a non-open systems reference in the data; and such that if a partition cache entry contains a mapping between an open systems reference to a location in the data and a non-open systems reference to a location in the data, the open systems reference in that partition cache entry corresponds to a location in the data that exists within the location range corresponding to that partition cache entry index.

58. The computerized device of claim 57 wherein:

the data is assumed to be a predetermined size;

the plurality of partition cache entries comprise a predetermined number of successively ordered partition cache entries, each having a partition cache entry index having a value corresponding to a respective location in the predetermined number of successively ordered partition cache entries; and wherein the location range associated with each partition cache entry is set to a value corresponding to the value of the partition cache entry index multiplied by a location range increment, the location range increment being the predetermined size of the data divided by the predetermined number of partition cache entries.

59. The computerized device of claim 57 wherein the computerized device further performs the operations of:

manipulating the partition cache to accommodate creation of a partition cache entry based on the data access request if the data access request includes a first data reference that references an open systems location in the data that is beyond the location range corresponding to the last partition cache entry index.

60. The computerized device of claim 59 wherein the partition cache is a former partition cache and wherein when the computerized device performs the operation of manipulating the partition cache, the computerized device performs the operation of condensing the partition cache by:

i) copying the former partition cache to a new partition cache containing new partition cache entries;

ii) re-assigning a new location range to each partition cache entry index in the new partition cache, the new location range for each partition cache entry index being substantially twice a size of the location range assigned a corresponding partition cache entry having the same partition cache entry index value in the former partition cache; and ii) for each new partition cache entry in the new partition cache, selecting a mapping, if existent, from a single former partition cache entry for use as a mapping for the new partition cache entry, the mapping selected from a set of all former partition cache entries in the former partition cache that contain mappings having open systems references for locations that exist within the new location range for the new partition cache entry.

61. The computerized device of claim 59 wherein when the computerized device performs the operation of selecting a mapping, if existent, from a single former partition cache entry for use as a mapping for the new partition cache entry, the computerized device selects a mapping having a highest location value for the open systems reference from the set of all former partition cache entries in the former partition cache that contain mappings having open systems references for locations that exist within the new location range for the new partition cache entry.

62. The computerized device of claim 59 wherein when the computerized device performs the operation of manipulating the partition cache to accommodate creation of a partition cache entry, the computerized device performs the operation of:

adding successive additional partition cache entries onto the end of the partition cache and assigning a corresponding location range to each added partition cache entry until enough successive additional partition cache entries are added that contain corresponding location ranges in which the reference to an open systems location can exist.

63. A computer program product having a computer-readable medium including computer program logic encoded thereon that, when executed on a processor in a computerized device provides access to data by causing the processor to perform the operations of:

receiving a data access request containing a first data reference;

obtaining a history cache entry from a history cache based on the first data reference;

obtaining a partition cache entry from a partition cache based on the first data reference; and performing a data access operation on the data as specified in the data access request using a second data reference obtained from one of the history cache entry and the partition cache entry, the history cache including a plurality of history cache entries, each history cache entry containing a mapping between an open systems reference to a location in the data and a non-open systems reference to a location in the data, and each history cache entry being obtained from a former data access operation to the data; and wherein the step of obtaining a history cache entry includes the step of comparing the first data reference to each history cache entry in the history cache to select a selected history cache entry that is closest to the first data reference.

64. A computerized device comprising:

an interface;

a memory system;

a processor; and an interconnection mechanism connecting the interface, the processor and the memory system;

wherein the memory system is encoded with a cache manager application that when performed on the processor, produces a cache manager process that provides a means for access to data which is accessible to the computerized device, the means including:

means for receiving a data access request via the interface containing a first data reference;

means for obtaining a history cache entry from a history cache in the memory system based on the first data reference;

means for obtaining a partition cache entry from a partition cache in the memory system based on the first data reference;

means for performing a data access operation on the data as specified in the data access request using a second data reference obtained from one of the history cache entry and the partition cache entry, the history cache including a plurality of history cache entries, each history cache entry containing a mapping between an open systems reference to a location in the data and a non-open systems reference to a location in the data, and each history cache entry being obtained from a former data access operation to the data; and wherein the step of obtaining a history cache entry includes the step of comparing the first data reference to each history cache entry in the history cache to select a selected history cache entry that is closest to the first data reference.

65. A method for providing access to data, the method comprising the steps of:

receiving a data access request containing a first data reference;

obtaining a history cache entry from a history cache based on the first data reference;

obtaining a partition cache entry from a partition cache based on the first data reference;

performing a data access operation on the data as specified in the data access request using a second data reference obtained from one of the history cache entry and the partition cache entry; and comparing the obtained partition cache entry to the obtained history cache entry prior to performing the data access operation.

66. A method as in claim 65, wherein the partition cache entry and the history cache entry identify at least an approximate location of the data to be accessed; and wherein comparing the obtained partition cache entry to the obtained history cache entry further includes:

selecting reference information associated with either the partition cache entry or the history cache entry to be the second data reference used to perform the data access operation depending on a relative nearness of a value of the first data reference to values of reference information associated with the partition cache entry and history cache entry.

67. A method as in claim 65 further comprising:

generating the data access request for retrieval of data based on a first format but performing the data access operation to access the information stored according to a second format.

* * * * *